US011601551B2

(12) United States Patent
Reddy et al.

(10) Patent No.: US 11,601,551 B2
(45) Date of Patent: Mar. 7, 2023

(54) METHODS AND SYSTEMS FOR PROVIDING RICH INTERACTIVE COMMUNICATION SERVICES ON AN ELECTRONIC DEVICE

(71) Applicant: Samsung Electronics Co., Ltd., Gyeonggi-do (KR)

(72) Inventors: Sreenivasa Dhamaragunta Reddy, Bangalore (IN); Ariyalur Chandrasekaran Ganesh, Bangalore (IN); Ravikumar Kalaimani, Bangalore (IN); Srinidhi N, Banaglore (IN)

(73) Assignee: Samsung Electronics Co., Ltd

(*) Notice: Subject to any disclaimer, the term of this patent is extended or adjusted under 35 U.S.C. 154(b) by 0 days.

(21) Appl. No.: 17/020,055

(22) Filed: Sep. 14, 2020

(65) Prior Publication Data

US 2021/0084160 A1 Mar. 18, 2021

(30) Foreign Application Priority Data

Sep. 12, 2019 (IN) .................. 201941036798 PS
Sep. 9, 2020 (IN) .................. 201941036798 CS

(51) Int. Cl.
*H04M 3/51* (2006.01)
*H04L 65/1016* (2022.01)
(Continued)

(52) U.S. Cl.
CPC ...... *H04M 3/5183* (2013.01); *H04L 65/1016* (2013.01); *H04L 65/1089* (2013.01); *H04L 67/131* (2022.05); *H04M 3/5116* (2013.01)

(58) Field of Classification Search
CPC combination set(s) only.
See application file for complete search history.

(56) References Cited

U.S. PATENT DOCUMENTS 8,713,200 B2   4/2014  Hsiao et al.
10,187,486 B1* 1/2019  Toksoz ............... G06F 11/3438
(Continued)

FOREIGN PATENT DOCUMENTS

EP      3 211 840      5/2019
WO   WO 2008/148100   12/2008

OTHER PUBLICATIONS

International Search Report dated Dec. 8, 2020 issued in counterpart application No. PCT/KR2020/012373, 8 pages.
(Continued)

*Primary Examiner* — Phung-Hoang J Nguyen
(74) *Attorney, Agent, or Firm* — The Farrell Law Firm, P.C.

(57) ABSTRACT

Disclosed is a method for providing at least one rich interactive communication service on an electronic device including receiving, by the electronic device, a notification of at least one communication service from at least one server, identifying, by the electronic device, at least one unique identifier of the received at least one communication service based on the notification, determining, by the electronic device, that the identified unique identifier is authenticated, sending, by the electronic device, a request to at least one communication server based on the identified identifier, in response to determining that the identified unique identifier is authenticated, receiving, by the electronic device, at least one rich media for the received at least one communication service from the at least one communication server, responding to the request, and displaying, by the electronic device, the received at least one communication service with the least one rich media.

11 Claims, 30 Drawing Sheets

(51) Int. Cl.
    *H04L 65/1089*     (2022.01)
    *H04L 67/131*     (2022.01)

(56) References Cited

U.S. PATENT DOCUMENTS

| | | |
|---|---|---|
| 2005/0204309 A1 | 9/2005 | Szeto |
| 2010/0275131 A1 | 10/2010 | Kunz et al. |
| 2011/0258049 A1 | 10/2011 | Ramer et al. |
| 2013/0160120 A1 | 6/2013 | Malaviya et al. |
| 2013/0254807 A1* | 9/2013 | Gorsuch ............ H04N 7/17318 725/40 |
| 2014/0136990 A1* | 5/2014 | Gonnen .................. H04L 51/18 715/752 |
| 2015/0254727 A1* | 9/2015 | Papageorgiou ........ G16H 10/60 705/3 |
| 2017/0094057 A1 | 3/2017 | Naiga et al. |
| 2019/0005145 A1* | 1/2019 | Kleinberg ........... G06F 16/2379 |
| 2019/0199699 A1 | 6/2019 | Smith et al. |
| 2019/0244219 A1 | 8/2019 | Lindblom et al. |

OTHER PUBLICATIONS

European Search Report dated May 23, 2022 issued in counterpart application No. 20863219.0, 10 pages.
Indian Examination Report dated Jun. 8, 2022 issued in counterpart application No. 201941036798, 7 pages.
European Search Report dated Sep. 12, 2022 issued in counterpart application No. 20863219.0-1213, 18 pages.

* cited by examiner

FIG.9

METHODS AND SYSTEMS FOR PROVIDING RICH INTERACTIVE COMMUNICATION SERVICES ON AN ELECTRONIC DEVICE

CROSS REFERENCE TO RELATED APPLICATION(S)

This application is based on and claims priority under 35 U.S.C. § 119(a) to Indian Provisional Patent Application Serial No. 201941036798 (PS), filed on Sep. 12, 2019, in the Indian Intellectual Property Office, and to Indian Complete Patent Application Serial No. 201941036798 (CS), filed on Sep. 9, 2020, in the Indian Intellectual Property Office, the disclosures of which are incorporated herein by reference in their entireties.

BACKGROUND

1. Field

The disclosure relates generally to electronic devices, and more particularly, to providing rich interactive communication services on the electronic devices.

2. Description of Related Art

A conventional electronic device receives one or more communication services from business entities via a dedicated channel and displays the received one or more communication services to a user. The communication services may include application-to-person (A2P) content, which may be used by the business entities for marketing purposes. Examples of the communication services may be messages or voice calls. However, the conventional art does not teach launching any actionable service for the provided communication services. The actionable service may include rich content including media, links, previews, or text, and chat-box services, which renders the conventional art deficient in enhancing user experience.

Therefore, there is a need in the art for a more convenient and user-friendly provision to launch actionable services for provided communication services in an electronic device.

SUMMARY

The disclosure is provided to address at least the above-mentioned problems and/or disadvantages and to provide at least the advantages described below.

Accordingly, an aspect of the disclosure is to provide rich interactive communication services on an electronic device, including a communication service and rich media content.

Another aspect of the disclosure is to provide methods and systems for converting a normal message into a rich interactive message and enhancing a voice call with a call context, without performing any modifications in an existing mobile network operator network/communication network.

In accordance with an aspect of the disclosure, a method for providing at least one rich interactive communication service on an electronic device includes receiving, by the electronic device, a notification of at least one communication service from at least one server, identifying, by the electronic device, at least one unique identifier of the received at least one communication service based on the notification, determining, by the electronic device, that the identified unique identifier is authenticated, sending, by the electronic device, a request to at least one communication server based on the identified identifier, in response to determining that the identified unique identifier is authenticated, receiving, by the electronic device, at least one rich media for the received at least one communication service from the at least one communication server, responding to the request, and displaying, by the electronic device, the received at least one communication service with the least one rich media.

In accordance with another aspect of the disclosure, a method for managing at least one rich interactive communication service for an electronic device includes generating, by a communication server, at least one communication service and at least one rich media for the generated at least one communication service, upon receiving information related to at least one domain from at least one entity server, generating, by the communication server, at least one unique identifier for the at least one communication service associated with the at least one rich media, mapping, by the communication server, the at least one unique identifier with the rich media of the at least one communication service, sending, by the communication server, a notification of the at one communication service including the at least one unique identifier to the electronic device, the at least one unique identifier indicating that the corresponding at least one communication service is associated with the at least one rich media, receiving, by the communication server, a request including the at least one unique identifier from the electronic device for the at least one rich media of the at least one communication service, fetching, by the communication server, the at least one rich media for the at least one unique code received from the electronic device, and providing, by the communication server, the fetched at least one rich media to the electronic device.

In accordance with another aspect of the disclosure, an electronic device for at least one rich interactive communication service includes a memory; and at least one processor configured to receive a notification of at least one communication service including at least one unique identifier from the at least one server, identify at least one unique identifier of the received at least one communication service based on the notification, determine that the identified at least one unique identifier of the received at least one communication service is authenticated, send a request to at least one communication server based on the identified unique identifier, in response that the identified unique identifier is authenticated, and receive at least one rich media for the received at least one communication service from the at least one communication server, responding to sending the request, and display the received at least one communication service with the least one rich media.

In accordance with another aspect of the disclosure, a communication server for managing at least one rich interactive communication service for an electronic device includes a memory, and at least one processor configured to generate at least one communication service and at least one rich media for the generated at least one communication service, upon receiving information related to at least one domain from at least one entity server, generate at least one unique identifier for the at least one communication service associated with the at least one rich media, map the at least one unique identifier with the rich media of the at least one communication service, send a notification of the at one communication service including the at least one unique identifier to the electronic device, wherein the at least one unique identifier indicates that the corresponding at least one communication service is associated with the at least one rich media, receive a request including the at least one unique identifier from the electronic device for the at least one rich media of the at least one communication service, fetch the at least one rich media for the at least one unique code received from the electronic device, and provide the fetched at least one rich media to the electronic device.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 6, 7, 8A, 8B, 9, 10, 11, 12, 13, 14, 15, 16, 17 and 18 illustrate examples of providing the rich interactive messages on the electronic device, according to embodiments;

DETAILED DESCRIPTION

Figure 1A:
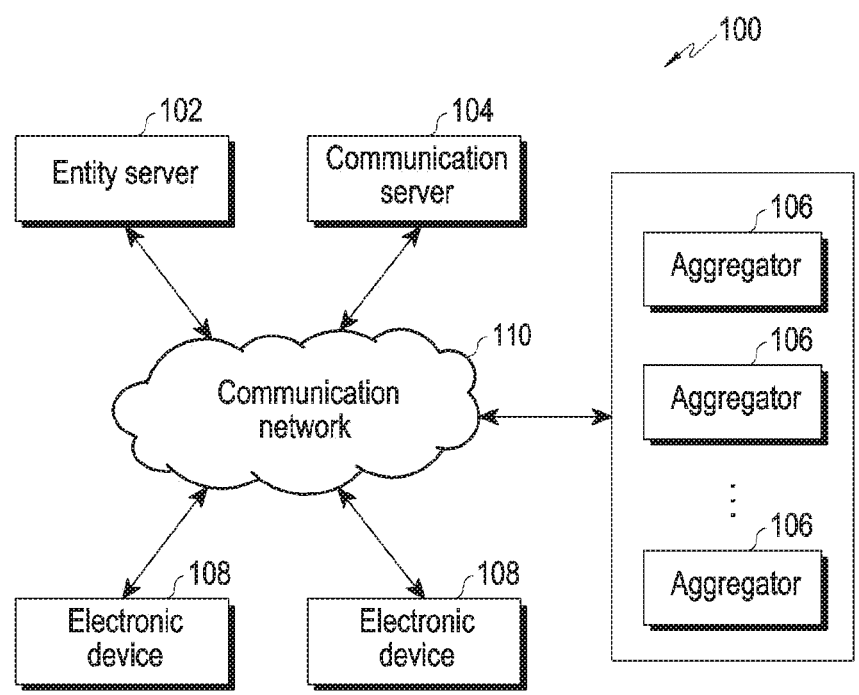
FIG. 1A illustrates a rich interactive communication system, according to an embodiment.

Hereinafter, embodiments will be described in detail with reference to the accompanying drawings. Although specific embodiments are illustrated in the drawings and described in detail with reference thereto, this is not to limit the embodiments to specific forms. In addition, descriptions of well-known functions and constructions may be omitted for the sake of clarity and conciseness.

The terms and words used in the following description and claims are not limited to their dictionary meanings, but are merely used to enable a clear and consistent understanding of the disclosure. Accordingly, it should be apparent to those skilled in the art that the following description of embodiments of the disclosure is provided for illustration purposes only and not for the purpose of limiting the disclosure.

It is to be understood that the singular forms "a," "an," and "the" include plural referents unless the context clearly dictates otherwise. Thus, for example, reference to "a component surface" includes reference to one or more of such surfaces.

FIG. 1A illustrates a rich interactive communication system 100, according to an embodiment. The rich interactive communication system 100 may be configured to provide one or more rich interactive communication services to one or more users/customers/clients. The rich interactive communication services may be referred to communication services associated with rich media content. A rich media defines a broad range of interactive digital media that exhibit dynamic motion, taking advantage of enhanced sensory features such as video, audio, and animation. Embodiments herein use the terms such as "rich interactive communication service", "interactive multimedia communication service", "two-way communication service", "enhanced multimedia communication service", "enhanced message, voice call and communication service", "enriched message, voice call and communication service", and so on interchangeably to the communication service associated with the rich media content.

The communication services may be a means of communication between the one or more users/customers and one or more business entities/enterprisers/brands. The communication services may correspond to A2P content, which may be used by the business entities/enterprisers for marketing or promoting or providing information of a specific product or service. For example, the communication services may include at least one of, but not limited to, messaging services, voice based services, data based services, augmented reality (AR) services, virtual reality services, emergency services, Internet protocol (IP) multimedia subsystem (IMS) services, and a rich communication service (RCS). Examples of the messaging services may be, but are not limited to, a short messaging service (SMS), an email service, multimedia messaging service (MMS), an instant message or any other similar messaging service. Examples of the data-based services may be, but are not limited to, surfing the Internet, chat sessions, map based services, and voice over Internet protocol (VoIP). The communication service may be any service initiated in a mobile operator network environment.

The rich media content may be content or an actionable service used for enhancing user experience while providing the associated communication service. The rich media content may describe the associated communication service, or may provide additional information related to the associated communication service. The additional information may include at least one of, but not limited to, name of a product/service, a logo of the product/service, call context, purpose of the voice call/message, location information, and means for triggering chat box/customer query services, advertisements. The rich media content may include at least one of, but not limited to, media, text, graphics, icons, links/uniform resource locators (URLs), previews, maps, triggers (links or any other similar means) for initiating chatbot/chat box services, interactive virtual elements/AR elements, web forms, advertising/advertisement content, or any other equivalent content that may describe the communication service or provide the additional information related to the communication service. Example of the media may be, but are not limited to, audio, images, raster images, videos, animations, and graphics interchange formats (GIFs). Embodiments herein interchangeably use terms and expressions such as, "rich media content", "rich media", "enriched media content", "metadata", and "service content" to refer to a content that describes the communication service.

Thus, providing the rich interactive communication services to the user may aid the user in at least one of retrieving information about scheduled appointments, making payments, receiving boarding passes, retrieving promotional marketing information, retrieving package delivery notifications, and accepting/rejecting calls.

The rich interactive communication system 100 includes one or more entity servers 102, a communication server 104, one or more aggregators 106, and one or more electronic devices 108. The components of the rich interactive communication system 100 may communicate with each other using a communication network 110. Examples of the communication network 110 are the Internet, a wireless fidelity (Wi-Fi) network, a cellular network, a Wi-Fi hotspot, Bluetooth®, Zigbee®, and a wired network.

The entity server(s) 102 may be associated with the enterprisers or the business entities or the bran (s that wish to market, promote or provide information about the products or services. The entity server 102 may be configured to store information about the one or more different products or services provided by the business entity under one or more domains. Each domain may specify a particular product or service. Examples of the information may be marketing details, promotion details, or description/details of the products or services, and notifications related to the products or services. For example, if the business entity is a banking entity, then the business entity may provide the one or more services, such as accounting services, loan services, credit and debit card services. In such a scenario, the entity server 102 may store information related to the accounting services under an accounting domain, information related to the loan services under a loan domain, information related to the credit and debit card services under a card domain, and so on. The entity server 102 may also be configured to provide the information stored under each domain to the communication server 104 for generating the communication services for the one or more electronic devices 108.

The communication server 104 may be configured to provide the rich interactive communication services to the users of the one or more electronic devices 108. The communication server 104 may be a standalone server or a server on a cloud. The communication server 104 may be any type of computing device such as a personal computer, a notebook, a tablet, desktop computer, a laptop, a handheld device, or a mobile device. The communication server 104 may be a cloud computing platform that can connect with devices located in different geographical locations.

The communication server 104 may be configured to generate the one or more communication services for the one or more electronic devices 108, upon receiving the information related to the one or more domains from the entity servers 102. The generated one or more communication services may include the A2P contents corresponding to the one or more domains of the entity server 102. The communication server 104 may generate the one or more communication services for the one or more electronic devices 108 based on a user/customer campaign. The customer campaign may be a plan, which includes at least one of information related to target users/customers (i.e., users of the one or more electronic devices 108), a selection of the communication services for the users, a time period to provide the communication services to the users, information related to purchase of the particular product/service by the users, or queries received from the users related to the particular product/service. The communication server 104 may generate the communication services using suitable existing communication service generation methods.

Upon generating the one or more communication services for the one or more electronic devices 108, the communication server 104 creates the rich media content for the generated one or more communication services corresponding to the one or more domains. The communication server 104 may create the rich media content based on the received information related to the one or more domains from the entity server 102. The communication server 104 may create the rich media content for the generated communication services using suitable existing rich media content creation methods.

The communication server 104 also generates a unique identifier/unique code for the one or more communication services for which the rich media content has been created, based on pre-defined methods such as a hashing method. The unique code of the communication service indicates that the corresponding communication service is associated with the rich media content (or the corresponding communication service is the rich interactive communication service) and provides an address/location for the one or more electronic devices 108 to fetch the rich media content for the one or more communication services. Examples of the unique code may be a URL, a token, a sender identifier (ID) (i.e., an ID of the communication server 104), a domain name, a hash, or any other equivalent ID, which may be used to specify that the communication service is the rich interactive communication service.

Embodiments herein use expressions such as "unique code", "unique identifier", "rich media content link", "rich interactive communication link", and "unique address", to refer to a parameter, which indicates that the communication service is the rich interactive communication service and indicates an address/location for the electronic device 108 to fetch the rich media content of the one or more communication services. The communication server 104 whitelists the unique code generated for the one or more communication services, so that the one or more electronic devices 108 explicitly access the unique code of the communication server 104 without blocking the reception of the communication services from the communication server 104.

The communication server 104 further maps the rich media content of the more communication services with the unique code of the corresponding one or more communication services. The communication server 104 stores the mapping of the rich media content with the unique code of the one or more communication services.

The communication server 104 sends the one or more communication services corresponding to the one or more domains and the associated unique code to the one or more aggregators 106 of the respective one or more domains through the communication network 110 for providing the one or more communication services and the associated unique code to the one or more electronic devices 108. The communication server 104 may directly send the one or communication services to the one or more electronic devices 108 through the communication network 110.

The communication server 104 may provide the rich media content associated with the one or more communication services to the one or more electronic devices 108, upon receiving a request from the one or more electronic devices 108 for the rich media content. The request may include the unique code of the one or more communication services. Upon receiving the request from the one or more electronic devices 108, the communication server 104 identifies the unique code in the received request and fetches the stored rich media content of the one or more communication services for the identified unique code. The communication server 104 provides the fetched rich media content of the one or more communication services to the one or more electronic devices 108.

The one or more aggregators 106 may be a standalone server or a server on a cloud or a storage server. The aggregator 106 may be any type of computing device such as a personal computer, a notebook, a tablet, desktop computer, a laptop, a handheld device or a mobile device. The one or more aggregators 106 may connect with devices located in different geographical locations. The one or more aggregators 106 may be associated with the one or more different domains and may be configured to receive the one or more communication services of the respective one or more domains and the associated unique code from the communication server 104. The one or more aggregators 106 may also be configured to send the one or more communication services and the associated unique code to the respective one or more electronic devices 108 through the communication network 110. For example, the aggregator 106 of a loan service domain may be configured to receive the communication service related to the loan service domain and the associated unique code from the communication server 104. The aggregator 106 of the loan service domain may also be configured to send the communication service and the associated unique code to the respective electronic device 108.

The communication server 104 may act as the one or more aggregators 106 and perform an intended function of the one or more aggregators 106.

The electronic device 108 may be any device that is capable of supporting the rich interactive communication services, such as a mobile phone, a smartphone, a tablet, a phablet, a personal digital assistant (PDA), a laptop, a computer, a wearable computing device, a vehicle infotainment device, an Internet of things (IoT) device, a virtual reality (VR)/AR device, a gaming console, a medical device, or any other device that is capable of receiving and providing the rich interactive communication services to the user.

The electronic device 108 may be configured to receive the communication service(s) from the aggregator(s) 106 or the communication server 104 through a dedicated channel of the communication network. Examples of the dedicated channel may be a message channel, a voice call channel, or a data channel. Upon receiving the communication service from the aggregator 106, the electronic device 108 determines whether the communication service is associated with the unique code. If the communication service is not associated with any unique code, the electronic device 108 considers that the received communication service is not the rich interactive communication service (i.e., is the normal communication service) and provides/displays the communication service to the user.

If the communication service is associated with the unique code, the electronic device 108 determines that the received communication service is the rich interactive communication service (i.e., the communication service is associated with the rich media content). Upon determining that the received communication service is the rich interactive communication service, the electronic device 108 determines whether the received unique code in the communication service is the whitelisted/authenticated unique code. The electronic device 108 may receive and maintain a plurality of whitelisted/authenticated unique codes. The electronic device 108 compares the received unique code with the maintained plurality of whitelisted/authenticated unique codes. If the received unique code does not match any one of the whitelisted unique codes, the electronic device 108 displays/provides the communication service as a normal service to the user.

If the received unique code matches any one of the whitelisted unique codes, the electronic device 108 parses the received unique code and identifies the address of the communication server 104 which has the rich media content for the received communication service.

The electronic device 108 may derive the unique code from the received communication service. For example, upon receiving a notification of voice call from the aggregator 106, the electronic device 108 derives the unique code from numbers associated with the received voice call. The electronic device 108 identifies the address of the communication server 104 or the communication server 104, which has the rich media content for the received communication service Upon identifying the communication server 104 having the rich media content, the electronic device 108 sends a request to the identified communication server 104 for the rich media content associated with the received communication service. The request may include the unique code associated with the received communication service. The electronic device 108 receives the rich media content associated with the communication service from the communication server 104 in response to the sent request. Upon receiving the rich media content, the electronic device 108 provides/displays the communication service with the rich media content to the user, or provides/displays the communication service to the user. Upon providing the communication service to the user, the electronic device 108 identifies an action performed by the user (or user behavior) on the provided communication service. Examples of the user action/user behavior may be opening the communication service, or performing a gesture (for example, a click gesture or a hovering action) on the communication service. Upon detecting the action performed by the user, the electronic device 108 displays the rich media content to the user.

The electronic device 108 initiates at least one service, if the user performs the action on the link/media embedded in the rich media content. For example, the at least one service includes displaying a preview of the at least one rich media content on a full screen, displaying interactive content related to the link in the at least one rich media content, launching at least oner service related to the link in the at least one rich media content, and launching chatbot/chat box services.

Thus, the user may obtain the additional information related to the received communication services from the rich media content, which further enhances the user experience while providing the communication service.

Embodiments herein enable the communication server 104, and the electronic device 108 to securely exchange communication service(s) with the rich media content and the requests/messages between each other. The requests/messages and the communication service with the rich media content may be encrypted using private key and public key combinations and suitable encryption/decryption methods. Examples of the encryption/decryption methods may be an advanced encryption standard (AES) method, a counter with counter mode cipher block chaining message authentication code protocol (CCM) method, a no-padding symmetric method, and a Rivest-Shamir-Adleman (RSA) method.

Prior to exchanging messages/requests or the rich media content between the electronic device 108 and the communication server 104, the electronic device 108 may generate and store private keys for decrypting responses received from the communication server 104. The electronic device 108 also generates a public key and shares the generated public key to the communication server 104. Similarly, the communication server 104 may generate and store a private key for decrypting requests received from the communication server 104. The communication server 104 also generates a public key and shares the generated public key to the electronic device 108. The private and public keys of the electronic device 108 and the communication server 104 may be generated using the RSA method.

When the electronic device 108 wants to send the request to the communication server 104 for the rich media content, the electronic device 108 encrypts the request/request payload by generating a random key using the suitable encryption method (for example, the AES method). The electronic device 108 also obtains a timestamp in International Organization for Standardization (ISO) format. The electronic device encodes the last 8 characters of the obtained timestamp into a Base 64 format to use the encoded timestamp as an initial vector and random data/salt for encryption. The electronic device 108 encrypts the request payload with the generated random key and the encoded timestamp using the suitable encryption method. The electronic device 108 further encrypts the random key with the public key of the communication server 104, using the suitable encryption method (for example, the RSA method). The electronic device 108 also encodes the encrypted random key using suitable encryption method (for example, a Base 64 encryption method). The electronic device sets the encoded timestamp to a client request header (X-CLIENT_TS) and the encoded encrypted random key to client details in the encrypted request payload. The electronic device sends the encrypted request payload to the communication server 104. In addition to the encryption of the request payload, a secure hypertext transfer protocol (HTTP) may be used for the communication between the electronic device 108 and the communication server 104.

Upon receiving the encrypted request payload from the electronic device 108, the communication server 104 decrypts the encoded encrypted random key in the received encrypted request payload using a session key. The session key may be encrypted with the private key of the communication server 104 using the suitable encryption method (for example, the AES method). Upon decrypting the random key, the communication server 104 reads the client request header from the received encrypted request payload and decodes the last 8 characters of the client request header to decrypt the timestamp. Upon decrypting the client request header, the communication server 104 reads the client details from the received encrypted request payload and decrypts the client details using the decrypted random key and the decrypted client request header.

The communication server 104 identifies the unique code from the decrypted client details. The communication server 104 identifies the rich media content mapped with the identified unique code, creates a response payload including the identified rich media content and encrypts the response payload like the encryption of the request payload performed by the electronic device 108. The communication server 104 sends the encrypted response payload including the rich media content to the electronic device 108. The electronic device 108 decrypts the received encrypted response in the manner of the decryption of the request payload performed by the communication server 104 and obtains the rich media content of the communication service.

Thus, securely exchanging of the messages/requests and the rich media content between the electronic device 108 and the communication server 104 protects the communication between the electronic device 108 and the communication server 104 from one or more vulnerabilities, such as content security policy, cross site scripting (XSS) protection, click jacking, structured query language (SQL) injection, HTTP strict transport security (HSTS) to prevent protocol downgrade and cookie hijacking, an application protocol interface (API) limit rate setting to prevent HTTP flooding and poor bot engagement, denial of service (DOS) attach, scanners and probes.

Figure 1B:
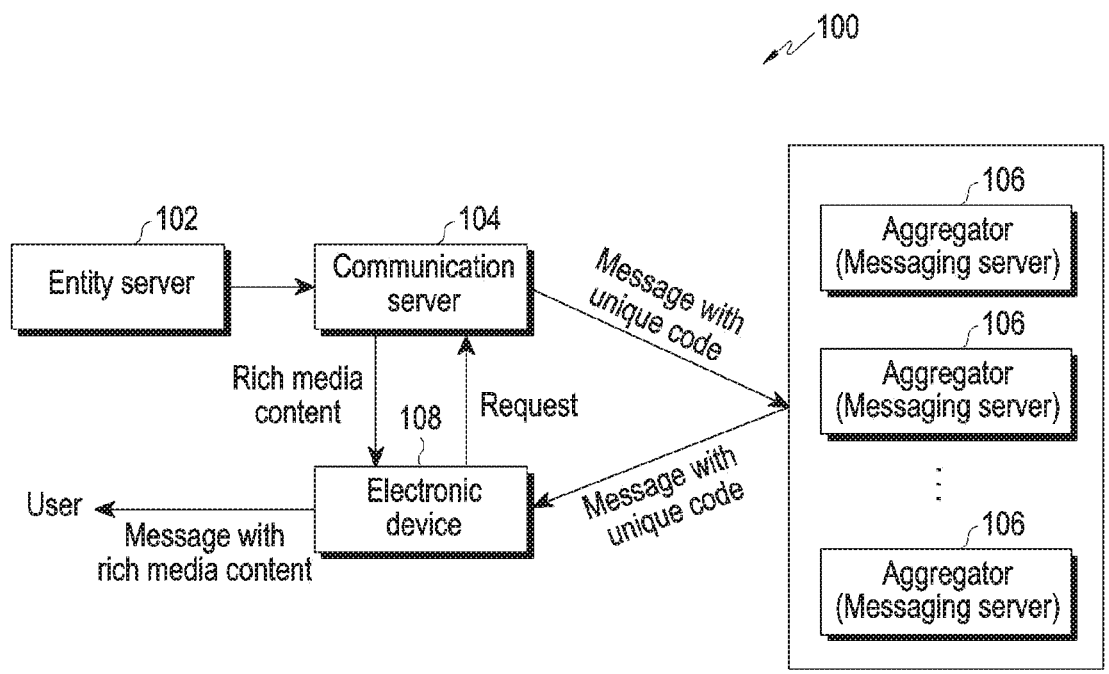
FIG. 1B illustrates the rich interactive communication system for providing a rich interactive messaging service on an electronic device, according to an embodiment.

FIG. 1B illustrates the rich interactive communication system 100 for providing a rich interactive messaging service on the electronic device 108, according to an embodiment.

Embodiments herein explain providing of rich interactive messaging service as an example rich interactive communication service on the electronic device 108, but it may be obvious to a person skilled in the art that any other rich interactive communication services may be considered. The messaging service may include at least one of an SMS, an email service, an MMS, an instant message, or any other equivalent messaging service.

As illustrated in FIG. 1B, the communication server 104 receives the information from the entity server(s) 102 related to the specific domain(s). The domain may specify the particular product or service that is being provided by the business entities/enterprisers/brands of the entity server 102. The received information may include details such as information related to the product or service, marketing details, promotion details, description of the product/service, offers available for the product/service, and chatbot links for querying related to the product/service. The information related to the product or service includes details such as brand name, a logo of the brand, and a URL of the brand logo.

The communication server 104 generates the messaging service(s)/message(s) based on the received information related to the specific domain from the entity server 102. The message may include the A2P contents such as the promotion details, the marketing details, the description of the product/service, and the offers available for the product/service. The communication server 104 also generates the rich media content for the generated message, based on the received information related to the specific domain from the entity server 102. The rich media content may be provided to the user in a form of, at least one of media, text, graphics, icons, links/URLs, previews, maps, triggers (links or any other similar means) for initiating chatbot services, interactive virtual elements/AR elements, web forms, advertising/advertisement content, or any other equivalent form. The rich media content may provide the additional information such as the brand name, the brand logo, the preview of the product/service, and the URL of the brand logo, the chatbot links.

The communication server 104 converts the message (for which the rich media content has been created) into the rich interactive message by generating the unique code for the message. The unique code may include at least one of the domain name, the URL, the sender ID, the hash, and the token. The communication server 104 associates the message with the unique code.

The communication server 104 maps and stores the message including the unique code with the rich media content. The communication server 104 sends the message (corresponding to the particular domain) including the unique code to the aggregator(s) 106 of the corresponding domain. For example, the aggregator 106 acts as a messaging server 106. The aggregator 106 sends the message including the unique code to the electronic device 108 through the communication network 110.

Upon receiving the message from the aggregator 106, the electronic device 108 determines whether the received message includes the whitelisted/authenticated unique code. If the received message includes the whitelisted unique code, the electronic device 108 considers that the received message is the rich interactive message (i.e., the message has been associated with the rich media content). The electronic device 108 further determines whether the electronic device 108 supports the rich interactive message. If the electronic device 108 does not support the rich interactive message, the electronic device 108 displays/provides the received message to the user as a normal message.

If the electronic device 108 supports the rich interactive message, the electronic device 108 identifies the communication server 104 from the unique code, which has the rich media content for the received message. The electronic device 108 sends the request (including the unique code) to the communication server 104 for the rich media content. Upon receiving the request from the electronic device 108, the communication server 104 fetches the rich media content of the message mapped with the unique code in the received request and sends the rich media content to the electronic device 108.

Upon receiving the rich media content from the communication server 104, the electronic device 108 displays/provides the corresponding message to the user. The electronic device 108 further displays the rich media content of the message to the user, upon detecting the action performed by the user on the displayed message.

The electronic device 108 further identifies the action performed by the user on the rich media content and initiates the at least one service. The at least one service may include at least one of initiating chatbot services displaying forms, displaying questionnaires, or the like defined by the entity server 102 (i.e., enabling a connection between the user and the entity server 102).

Figure 1C:
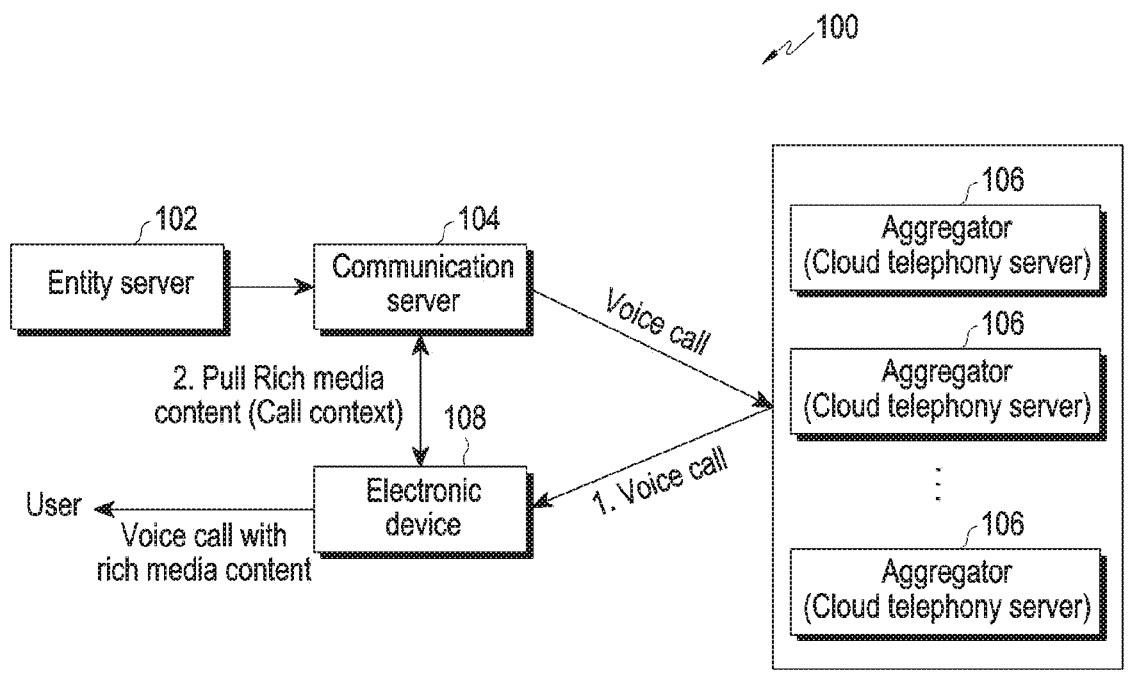
FIGS. 1C and 1D illustrate the rich interactive communication system for providing a rich interactive voice call on the electronic device, according to an embodiment.
Figure 1D:
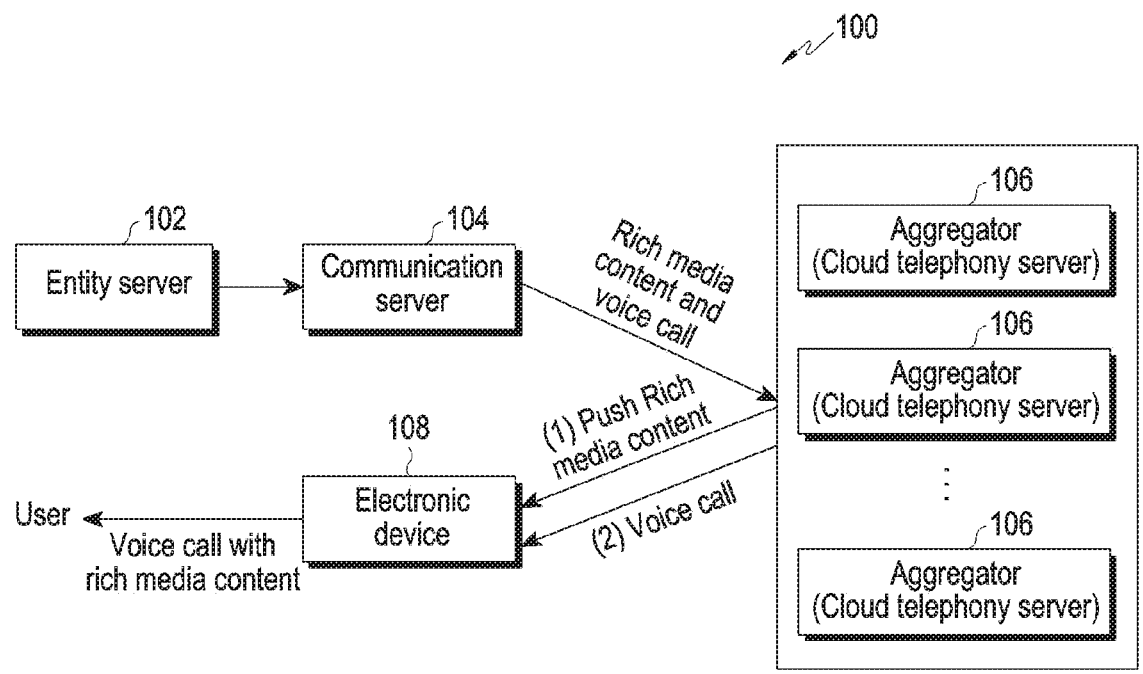

FIGS. 1C and 1D illustrate the rich interactive communication system 100 for providing a rich interactive voice call (an example of the rich interactive communication services) on the electronic device 108, according to an embodiment.

Embodiments herein explain providing of rich interactive voice call as an example rich interactive communication service on the electronic device, but it may be obvious to a person skilled in the art that any other rich interactive communication services may be considered. The voice call may include a regular/analog voice call or a VoIP call.

As illustrated in FIG. 1C, the entity server 102 enables an agent of the enterprise/business entity/brand to provide the information related to the specific domain for generating the voice call. The voice call may be used for promoting or marketizing or providing the information related to the particular product or service. The information may include at least one of call context, brand (product/service) name, brand logo, details related to the product/service, and offers related to the product/service. The call context may include information such as an agent number, a customer/user number, priority of the voice call (for example, urgent, or the like), and a purpose/subject of the call. The electronic device 108 pulls the call context included in the voice call to the communication server 104, entity server 102 provides the information related to the specific domain to the communication server 104 for generating/initiating the voice call, and the communication server 104 provides the information to the electronic device 108.

The communication server 104 may generate the voice call for the electronic device 108 based on the received information from the entity server 102. The communication server 104 also creates the rich media content for the generated voice call. The rich media content may be provided to the user in a form of, at least one of media, text, graphics, icons, links/URLs, previews, maps, triggers (links or any other similar means) for initiating chatbot services, interactive virtual elements/AR elements, web forms, advertising/advertisement content, or any other equivalent form. The rich media content may provide the additional information such as the call context, the brand name, the brand logo, the preview of the product/service, the URL of the brand logo, and the chatbot links.

On creating the rich media content for the voice call, the communication server 104 converts the voice call into the rich interactive voice call by generating the unique code for the voice call. The unique code may include at least one of the domain name, the URL, the sender ID, the hash, and the token. The communication server 104 associates the voice call with the unique code. The communication server 104 maps and stores the voice call including the unique code with the rich media content.

The communication server 104 sends the rich media content mapped with the unique code of the voice call (corresponding to the particular domain) to the aggregator(s) 106 of the respective domain. For example, the aggregator 106 acts as a cloud telephony server. The aggregator 106 stores the rich media content mapped with the voice call including the unique code.

In an embodiment, on storing the rich media content in the aggregator 106, the communication server 104 provides the generated voice call to the electronic device 108 through the communication network 110. Upon receiving the voice call, the electronic device 108 derives the unique code from numbers (for example, a caller number and a callee number) associated with the voice call. The electronic device 108 may derive the unique code using example methods such as, but is not limited to, a hashing method, or the like. The electronic device 108 identifies the communication server 104 from the unique code, which has the rich media content of the voice call. The electronic device 108 sends the request including the unique code to the communication server 104. The communication server 104 may fetch the stored rich media content of the voice call for the received unique code. The communication server 104 may access the aggregator 106 and fetch the stored rich media content of the voice call for the received unique code. The communication server 104 provides the rich media content of the voice call to the electronic device 108 through the communication network 110. Upon receiving the rich media content from the communication server 104, the electronic device 108 provides a notification of the voice call and the rich card content to the user.

As illustrated in FIG. 1D, on storing the rich media content in the aggregator 106, the communication server 104 enables the aggregator 106 to provide the rich media content and the unique code of the voice call to the electronic device 108 through the communication network 110 for storage. That is, the communication server 104 provides the rich media content and voice call to the aggregator 106 and the aggregator 106 provides the voice call and the rich media content including the unique code of the voice call to the electronic device 108 through the communication network 110 for storage. The communication server 104 may directly provide the rich media content and the unique code of the voice call to the electronic device 108 through the communication network 110 for storage. Upon providing the rich media content and the unique code of the voice call to the electronic device 108, the communication server 104 provides the generated voice call to the electronic device 108 through the communication network 110. Upon receiving the voice call, the electronic device 108 derives the unique code from the received voice call. The electronic device 108 fetches the stored rich media content corresponding to the derived unique code from the voice call. The electronic device 108 provides the notification of the voice call and the rich media content to the user. The user may accept/reject the voice call based on the additional information stored in the rich card content. Thus, the voice call acceptance may be improved and revenue share per voice call may be increased.

FIGS. 1A, 1B, 1C and 1D show blocks of the rich interactive communication system 100, but it is to be understood that other embodiments are not limited thereto. In other embodiments, the rich interactive communication system 100 may include fewer or more number of blocks. The labels or names of the blocks are used only for illustrative purposes and does not limit the scope of the embodiments herein. One or more blocks can be combined to perform same or substantially similar function in the rich interactive communication system 100.

Figure 2:
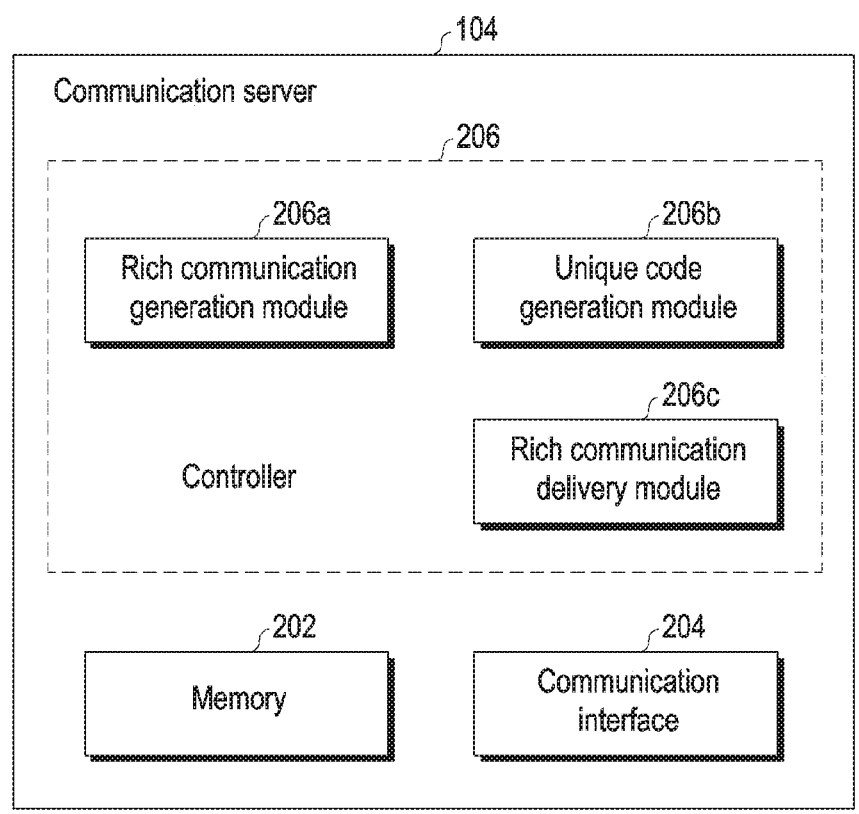
FIG. 2 illustrates various components of a communication server for providing the rich interactive communication services on the electronic device, according to an embodiment.

FIG. 2 illustrates various components of the communication server 104 for providing the rich interactive communication services on the electronic device 108, according to an embodiment. The communication server 104 includes a storage unit 202, a communication interface 204, and a controller 206. The communication server 104 may also include input/output (I/O) ports, and a display.

The storage unit 202 may store at least one of the information related to the one or more domains (received from the entity servers 102), details related to the generated communication services, the rich media content, the unique code of the communication services, and the mapping of the rich media contents with respect to the communication services and the unique code of the communication services. Examples of the storage unit 202 are a database, a file server, a storage server, a cloud, and a memory.

The communication interface 204 may be configured to enable the communication server 104 to communicate with at least one external entity using the communication network 110. The at least one external entity includes at least one of the entity server 102, the one or more aggregators 106, and the one or more electronic devices 108.

The controller 206 may be at least one of a single processor, a plurality of processors, multiple homogeneous or heterogeneous cores, multiple central processing units (CPUs) of different types, microcontrollers, special media, and other accelerators. The controller 206 includes a rich communication generation module 206a, a unique code generation module 206b, and a rich communication delivery module 206c.

The rich communication generation module 206a may be configured to generate the communication service(s) for the electronic device(s) 108, upon receiving the information related to the specific domain(s) from the entity server(s) 102. The communication service(s) may correspond to the specific domain(s). The rich communication generation module 206a may also be configured to create the rich media content for the generated communication service, based on the received information related to the specific domain(s) from the entity server(s) 102. The rich communication generation module 206a sends the communication service and the rich media content created for the communication service to the rich communication delivery module 206c and sends the communication service to the unique code generation module 206b.

The unique code generation module 206b may be configured to generate the unique code for the generated communication service using a hashing method. The unique code may include at least one of a domain name, a URL, a token, a sender ID, and a hash. The unique code generation module 206b may also be configured to whitelist the unique code of the communication service for the electronic device 108. The unique code generation module 206b may send the whitelisted unique codes to the electronic device 108 for storage, prior to providing the communication services to the electronic device 108. Therefore, the electronic device 108 may not block the communication services including the whitelisted unique codes. The unique code generation module 206b provides the unique code of the communication service to the rich communication delivery module 206c.

The rich communication delivery module 206c may be configured to provide the rich interactive communication service(s) to the electronic device(s) 108. The rich communication delivery module 206c associates/includes the unique code in the communication service corresponding to the specific domain, stores the communication service and the associated unique code in the storage unit 202, and sends the communication service (corresponding to the specific domain) including the unique code to the aggregator 106 of the respective domain.

The rich communication delivery module 206c may also be configured to map the rich media content of the communication service with the unique code of the communication service. The rich communication delivery module 206c stores the mapping of the rich media content of the communication service with the unique code of the communication service in the storage unit 202. The rich communication delivery module 206c stores the mapping of the rich media content of the communication service with the unique code of the communication service in the aggregator 106 that is associated with the domain of the communication service.

The rich communication delivery module 206c may also be configured to enable the aggregator 106 to forward the communication service including the unique code to the respective electronic device 108 or without the unique code to the respective electronic device 108 based on the user/customer campaign, wherein the communication service is a voice call. In such a scenario, the electronic device 108 may derive the unique code from numbers associated with the voice call.

The rich communication delivery module 206c may also be configured to receive the request from the electronic device 108 for the rich media content of the communication service, on the electronic device 108 receiving/deriving the unique code of the communication service. The request may include the unique code of the communication service. Upon receiving the request from the electronic device 108 for the rich content, the rich communication delivery module 206c accesses the mapping of the rich media content of the communication service with the unique code of the communication service in the storage unit 202 and fetches the rich media content of the communication service for the received unique code. The rich communication delivery module 206c provides the fetched rich media content to the electronic device 108.

The rich communication delivery module 206c may be configured to enable the aggregator 106 to provide the mapped rich media content with the unique code of the communication service to the electronic device 108, prior to providing the communication service to the electronic device 108 through the communication network 110. The rich communication delivery module 206c may be configured to directly provide the mapped rich media content with the unique code of the communication service to the electronic device 108 for storage through the communication network 110, prior to providing the communication service to the electronic device 108. Therefore, the electronic device 108 may map and display the rich media content with the communication service to the user, upon receiving the communication service from the aggregator 106/the communication server 104.

FIG. 2 illustrates blocks of the communication server 104, but it is to be understood that other embodiments are not limited thereon. In other embodiments, the communication server 104 may include fewer or more blocks. The labels or names of the blocks are used only for illustrative purposes and does not limit the scope of the embodiments herein. One or more blocks can be combined to perform same or substantially similar function in the communication server 104.

Figure 3:
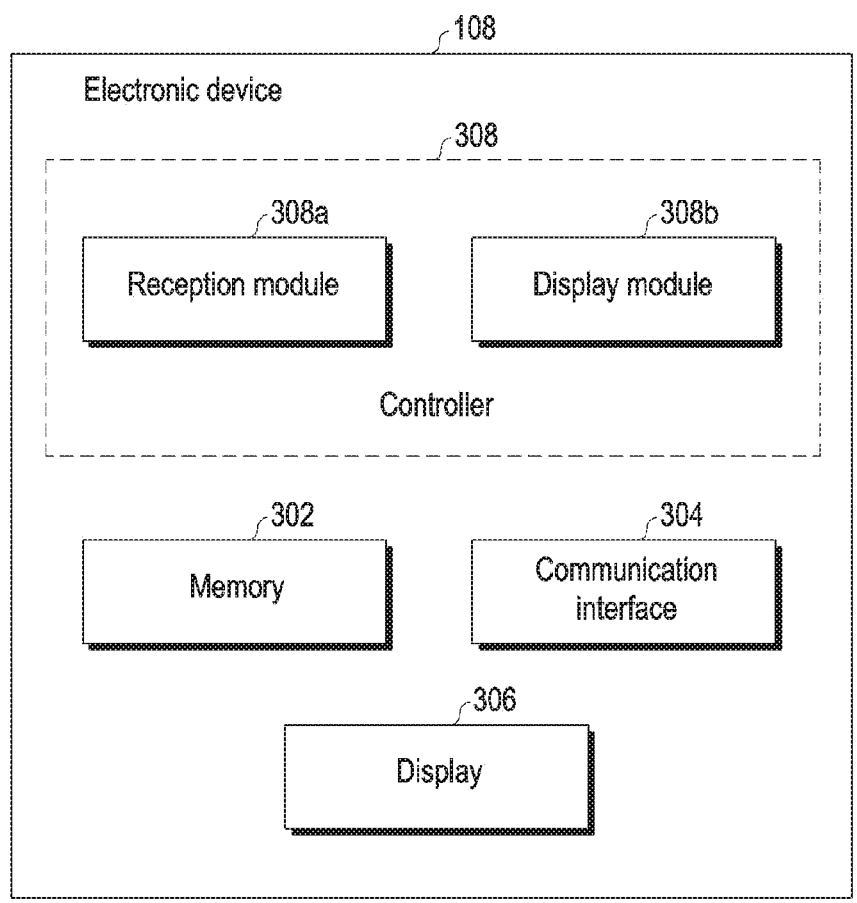
FIG. 3 illustrates various components of an electronic device for receiving and providing the rich interactive communication services to a user, according to an embodiment.

FIG. 3 illustrates various components of the electronic device 108 for receiving and providing the rich interactive communication services to the user, according to an embodiment. The electronic device 108 includes a memory 302, a communication interface 304, a display 306, and a controller (i.e., processor) 308. The electronic device 108 also includes I/O ports and communication ports.

The memory 302 may store at least one of the whitelisted unique codes, priority senders, and the rich media content and the associated unique code. Examples of the memory 302 may be not AND (NAND), embedded multimedia card (eMMC), secure digital (SD) cards, universal serial bus (USB), serial advanced technology attachment (SATA), and solid-state drive (SSD). The memory 302 may also include one or more computer-readable storage media. The memory 302 may also include non-volatile storage elements. Examples of such non-volatile storage elements may include magnetic hard discs, optical discs, floppy discs, flash memories, or forms of electrically programmable memories (EPROM) or electrically erasable and programmable memories (EEPROM). In addition, the memory 302 may be considered a non-transitory storage medium. The term "non-transitory" may indicate that the storage medium is not embodied in a carrier wave or a propagated signal. However, the term "non-transitory" should not be interpreted to mean that the memory 302 is non-movable. In certain examples, a non-transitory storage medium may store data that can, over time, change (e.g., in random access memory (RAM) or cache).

The communication interface 304 may be configured to enable the electronic device 108 to communicate with the communication server 104, the one or more aggregators 106, or the like using the communication network 110.

The display 306 may be configured to enable the user to interact with the electronic device 108. The display 306 may also be configured to display/provide the communication service and the rich media content on a display screen of the electronic device 108. The display 306 may also configured to enable the user to perform the action on the displayed communication service and the rich media content.

The processor 308 may be at least one of a single processer, a plurality of processors, multiple homogeneous or heterogeneous cores, multiple CPUs of different types, microcontrollers, special media, and other accelerators. The processor 308 may be configured to receive and display the rich interactive communication service to the user.

The processor 308 includes a reception module 308a and a display module 308b.

The reception module 308a may be configured to receive the communication service including the unique code from the aggregator 106 or the communication server 104. Upon receiving the communication service, the reception module 308a determines whether the unique code in the received communication service is the whitelisted unique code using the stored plurality of whitelisted/authenticated unique codes. If the unique code in the received communication service is the whitelisted unique code, the reception module 308a determines the communication server 104 that has the rich media for the communication service using the received unique code. The reception module 308a sends the request including the unique code to the communication server 104 for the rich media content. The reception module 308a receives the rich media content from the communication server 104 in response to the sent request. Upon receiving the rich media content, the reception module 308a provides the rich interactive communication service (i.e., the communication service and the rich media content) to the display module 308b for displaying to the user.

The reception module 308a may enable the user to add some brands/enterprisers/business entities as priority senders. Therefore, only upon receiving the communication service of the priority senders through the communication server 104/aggregator 106, the reception module 308a requests the communication server 104 for the rich media content of the communication service.

The reception module 308a may also be configured to derive the unique code from the communication service, if the received communication service is the voice call. For example, the reception module 308a may use a hashing method to derive the unique code from the voice call. Upon deriving the unique code, the reception module 308a determines the communication server 104 that has the rich media for the communication service using the received unique code. The reception module 308a sends the request including the unique code to the communication server 104 for the rich media content and obtains the rich media content from the communication server 104. Upon receiving the rich media content, the reception module 308a provides the rich interactive communication service (i.e., the communication service and the rich media content) to the display module 308b for displaying to the user.

The reception module 308a may also be configured to receive the rich media content and unique code of the communication service, prior to receiving the communication service from the aggregator 106/communication server 104. The reception module 308a stores the received rich media content and unique code in the memory 302. In such a scenario, upon receiving the communication service including the unique code or upon deriving the unique code from the communication service, the reception module 308b fetches the rich media content stored in the memory 302 for the received unique code of the communication service. The reception module 308a provides the rich interactive communication service (i.e., the communication service and the rich media content) to the display module 308*b* for displaying to the user.

The display module 308*b* may be configured to enable the display 306 to provide the rich interactive communication service to the user.

The display module 308*b* may enable the display 306 to display the communication service to the user initially, upon receiving the communication service and the rich media content from the reception module 308*a*. The display module 308*b* may enable the display 306 to display the rich media content of the communication service to the user, upon detecting the action performed by the user on the communication service.

The display module 308*b* may enable the display 306 to display the communication service and the associated rich media content to the user at a time, upon receiving the communication service and the rich media content from the reception module 308*a*.

The display module 308*b* may also be configured to initiate the at least one service, upon detecting the action performed by the user on the displayed rich media content.

FIG. 3 show exemplary blocks of the electronic device 108, but it is to be understood that other embodiments are not limited thereon. In other embodiments, the electronic device 108 may include fewer or more blocks. The labels or names of the blocks are used only for illustrative purposes and do not limit the scope of the embodiments herein. One or more blocks can be combined to perform same or substantially similar function in the electronic device 108.

Figure 4A:
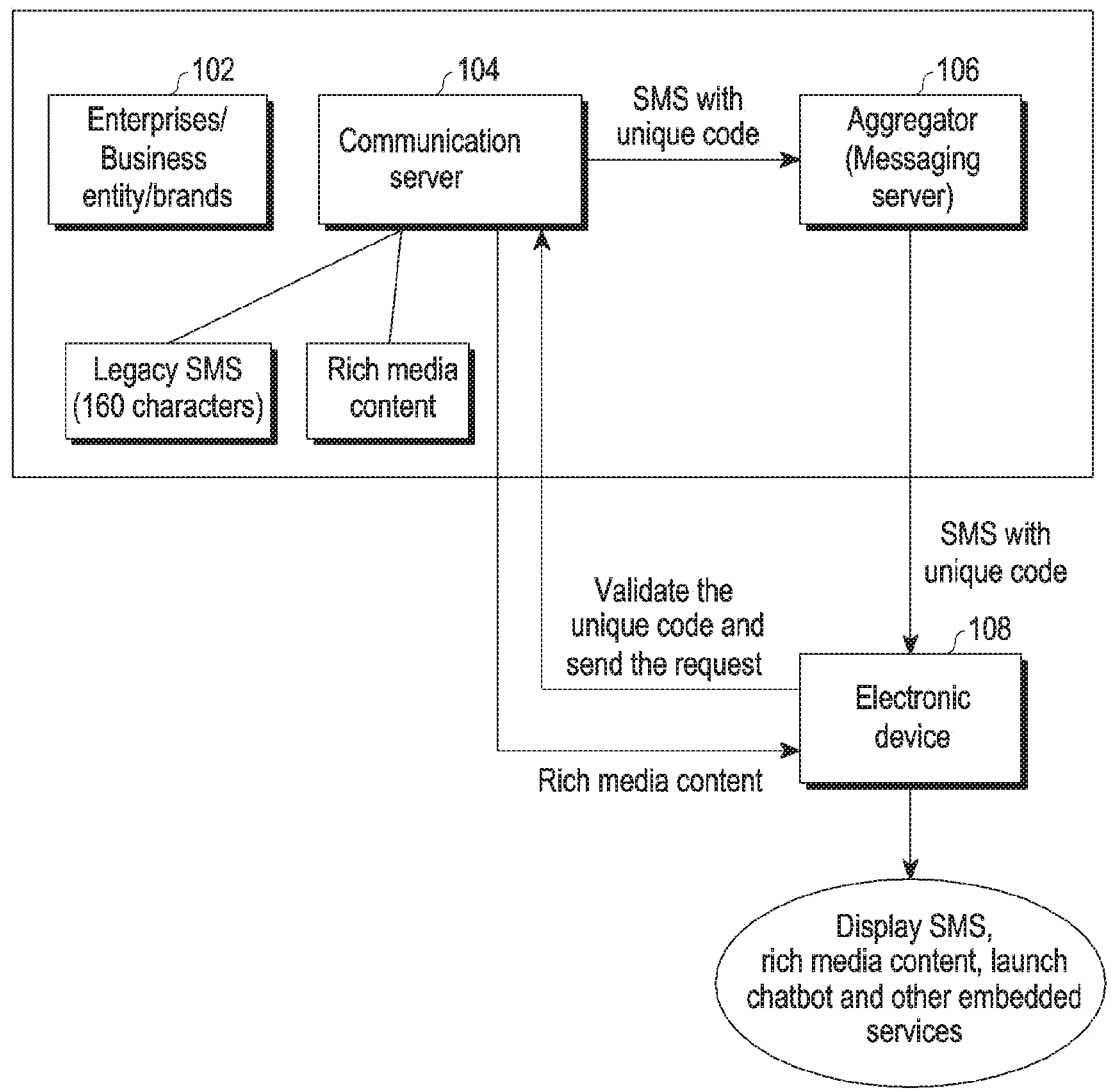
FIGS. 4A, 4B, and 4C illustrate providing the rich interactive messaging service on the electronic device, according to an embodiment.
Figure 4B:
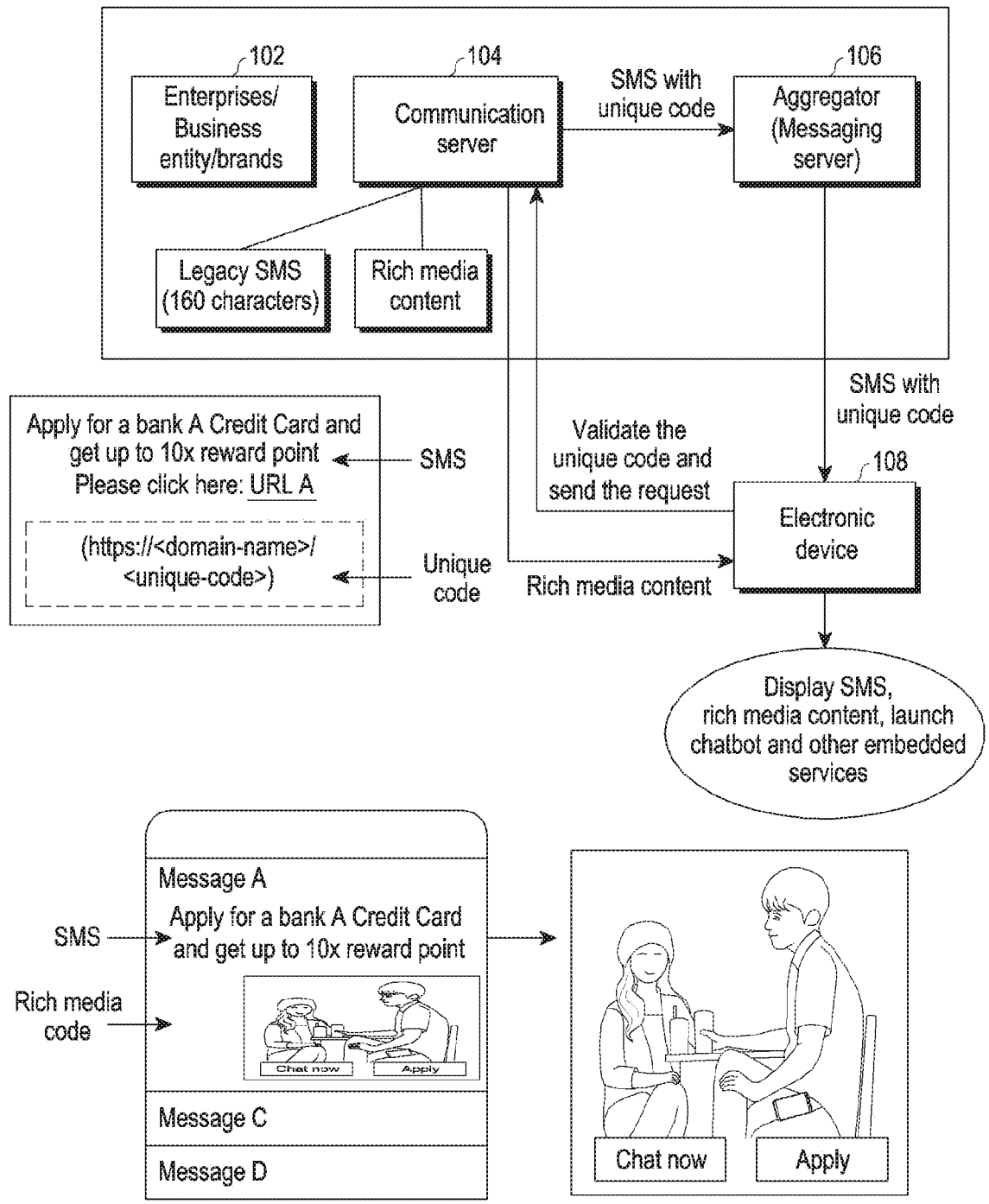
Figure 4C:
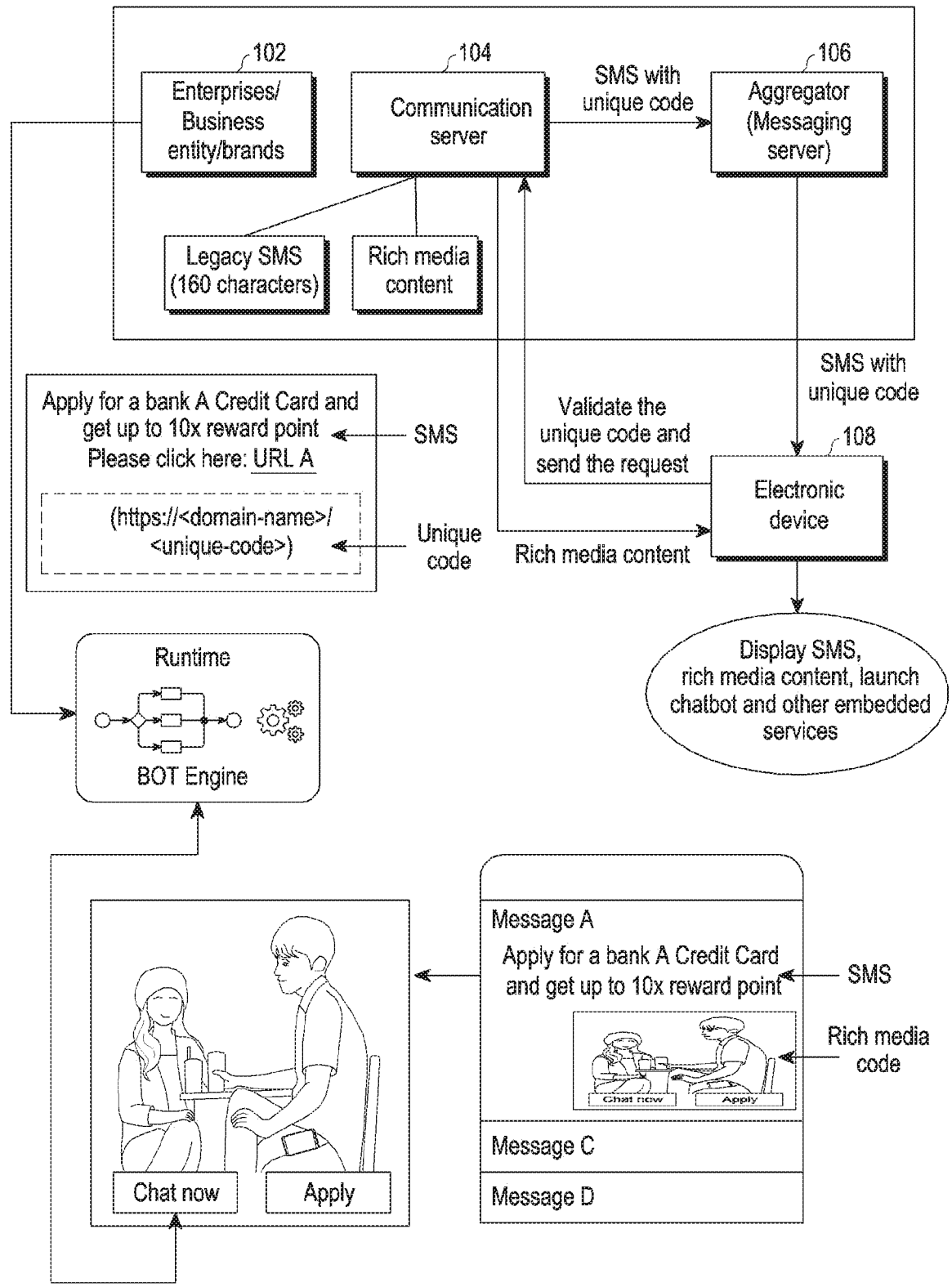

FIGS. 4A, 4B, and 4C illustrate providing the rich interactive messaging service on the electronic device 108, according to an embodiment. For example, the rich interactive messaging service/rich interactive message may be an example of the rich interactive communication service.

As illustrated in FIG. 4A, the entity server 102 associated with the enterprise/brand may send the information related to the domain that is being provided by the enterprise/brand to the communication server 104. The communication server 104 generates the message and creates the rich media content for the generated message, based on the received information from the entity server 102. For example, the message may be a legacy SMS, including 160 characters. The communication server 104 further generates the unique code and includes the unique code in the generated message. The communication server 104 sends the message including the unique code to the aggregator 106 of the respective domain of the message. The aggregator 106 sends the message including the unique code to the electronic device 108 through the communication network 110, based on the user/customer campaign. The communication server 104 may send the message including the unique code to the electronic device 108 through the communication network 110, based on the user/customer campaign.

Upon receiving the message including the unique code, the electronic device 108 considers that the received message is the rich interactive message (i.e., the received message associated with the rich media content). The electronic device 108 identifies the address of the communication server 104 including the rich media content for the received message using the unique code. The electronic device 108 sends the request including the unique code of the message to the communication server 104. The electronic device 108 receives the rich media content associated with the message from the communication server 104, in response to the sent request. The electronic device 108 displays the message with the rich media content to the user.

The electronic device 108 further displays a preview of the rich media content to the user, upon detecting the action performed by the user on the displayed messages. In addition, the electronic device 108 may launch the chatbot services or any other embedded services included in the rich media content, upon detecting the action performed by the user on the displayed rich media content.

For example, as illustrated in FIG. 4B, consider that the electronic device 108 displays the message of a particular bank to the user, wherein the message may be for promoting the user to apply for a credit card. When the user opens the message, the electronic device 108 provides a preview of the rich media content associated with the displayed message. In an example, as illustrated in the rich media content may include an image depicting details of the corresponding bank, reward options that the user may receive when applying for or being approved for the credit card, an apply option for applying for the credit card, and a chatbot option. For example as illustrated in FIG. 4C, the chatbot option may be for connecting the user with a chatbot engine for enquiring about the credit card or for receiving answers/clarifications for queries related to the credit card. The chatbot engine may be pre-defined by the enterprise/band on the entity server 102. For example, if the user clicks on the chatbot option, on displaying the rich media content, the electronic device 108 allows the user to connect with the pre-defined chat box engine for chat services.

Figure 5A:
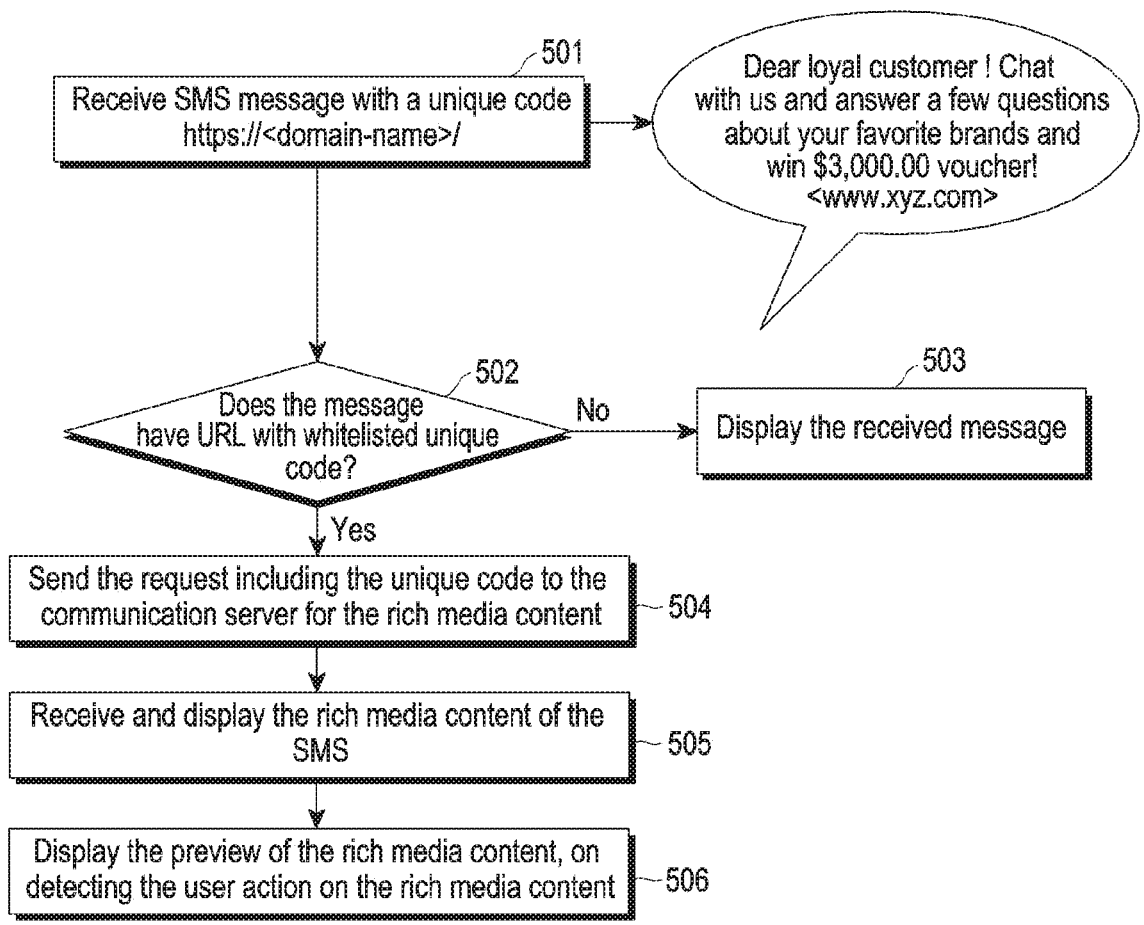
FIG. 5A illustrates the display of the rich interactive message on the electronic device, according to an embodiment.

FIG. 5A illustrates the display of the rich interactive message on the electronic device 108, according to an embodiment.

Referring to FIG. 5A, in step 501, the electronic device 108 receives the message (for example, a SMS) including the unique code from the communication server 104. For example, the received message may be "Dear loyal customer! Chat with us and answer a few questions about your favorite brands and win $3,000.00 voucher!" and the unique code may include the URL of the domain name such as <www.xyz.com>.

In step 502, the electronic device 108 determines whether the unique code included in the received message is the whitelisted unique code. If the unique code included in the received message is not the whitelisted unique code, in step 503, the electronic device 108 displays the received complete message including the URL as the normal message to the user.

If the unique code included in the received message is the whitelisted unique code, in step 504, the electronic device 108 identifies the pre-configured communication sever 104, which has the rich media content for the received message. The identified communication server 104 may not be the server corresponding to the URL included in the received message. The electronic device 108 sends the request including the unique code in the received message to the identified pre-configured communication server 104 for the rich media content associated with the received message.

In step 505, the electronic device 108 receives the rich media content of the received message from the communication server 104. The electronic device 108 displays the received message and the rich media content to the user. In step 506, the electronic device 108 displays the preview of the rich media content and establishes the chat session between the user of the electronic device 108 and the chatbot engine of the brand, when the user clicks on any action items included in the received interactive message.

Figure 5B:
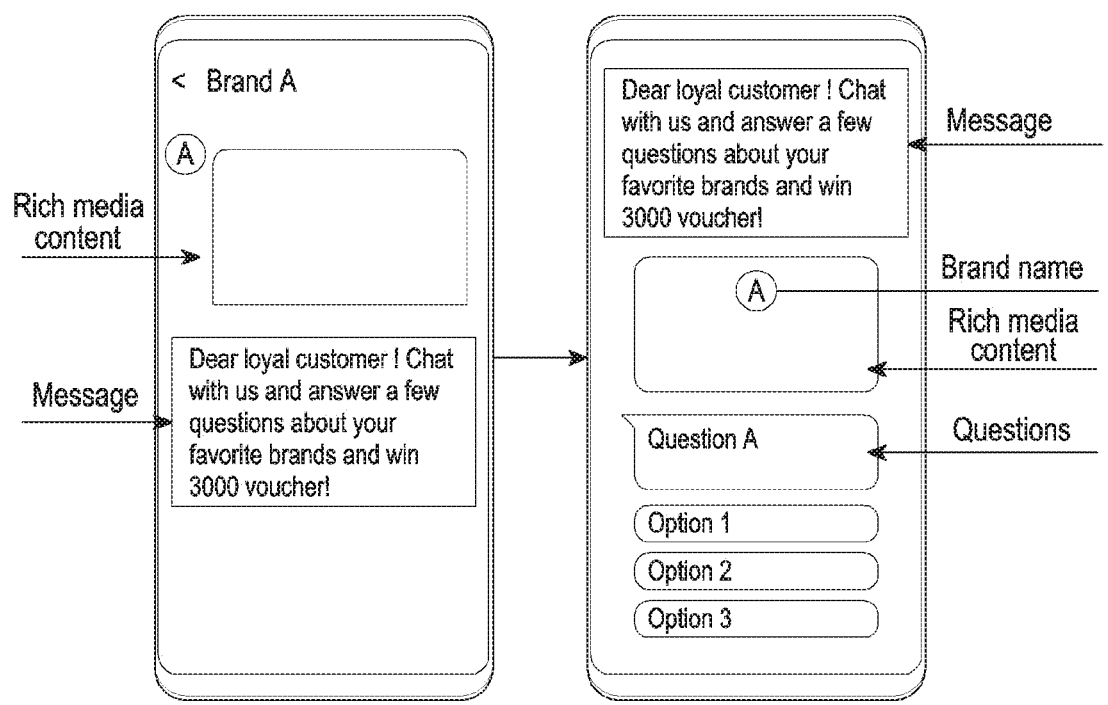
FIG. 5B illustrates an example message and associated rich media content, according to an embodiment.

For example, as illustrated in FIG. 5B, the rich media content may include a brand name, an image depicting an ongoing offer related to the brand, an applicable date for providing the offer, and a chat link. Further, when the user clicks on the chat link, the electronic device 108 displays the questions to the user, so that the user may answer the questions for providing the offer/voucher.

FIGS. 6, 7, 8, 9, 10, 11, 12, 13, 14, 15, 16, 17 and 18 illustrate example scenarios of providing the rich interactive messages on the electronic device 108, according to embodiments.

Figure 6:
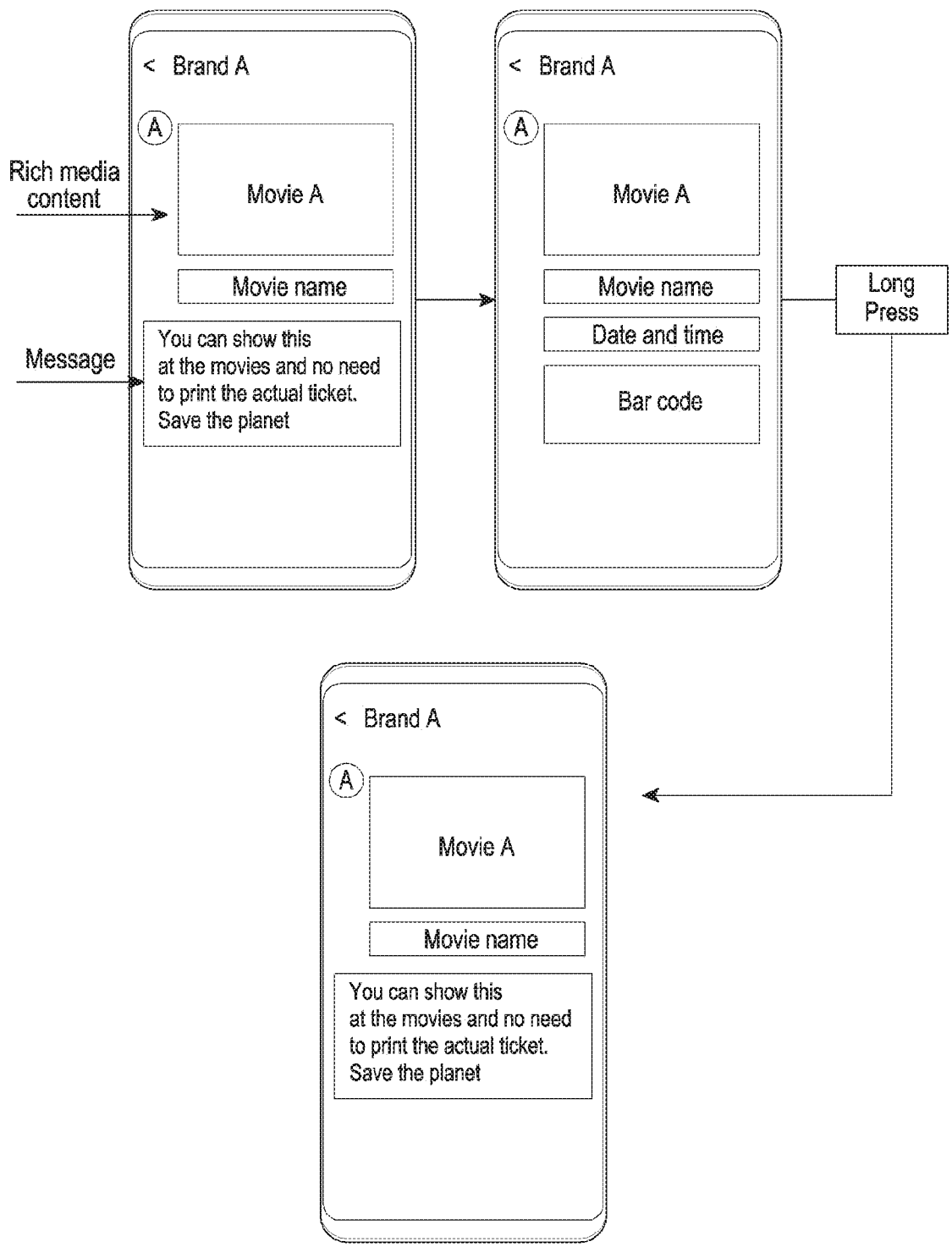

As illustrated in FIG. 6, the electronic device 108 books a movie ticket for movie A. In such a scenario, the electronic device 108 receives and displays a message related to the booked movie ticket for the movie A and a rich media content from the communication server 104/aggregator 106 to the user. For example, the rich media content includes an image describing the movie A. When the user clicks on the image, the electronic device 108 opens the rich media content in a full page and stores the image, and details of the movie A (such as a movie bar code, movie data, and movie time) included in the rich media content in the memory 302. In addition, the electronic device 108 may enable the user to perform at least one gesture (for example, a long press) on the rich media content to retain the rich media content in the normal message.

Figure 7:
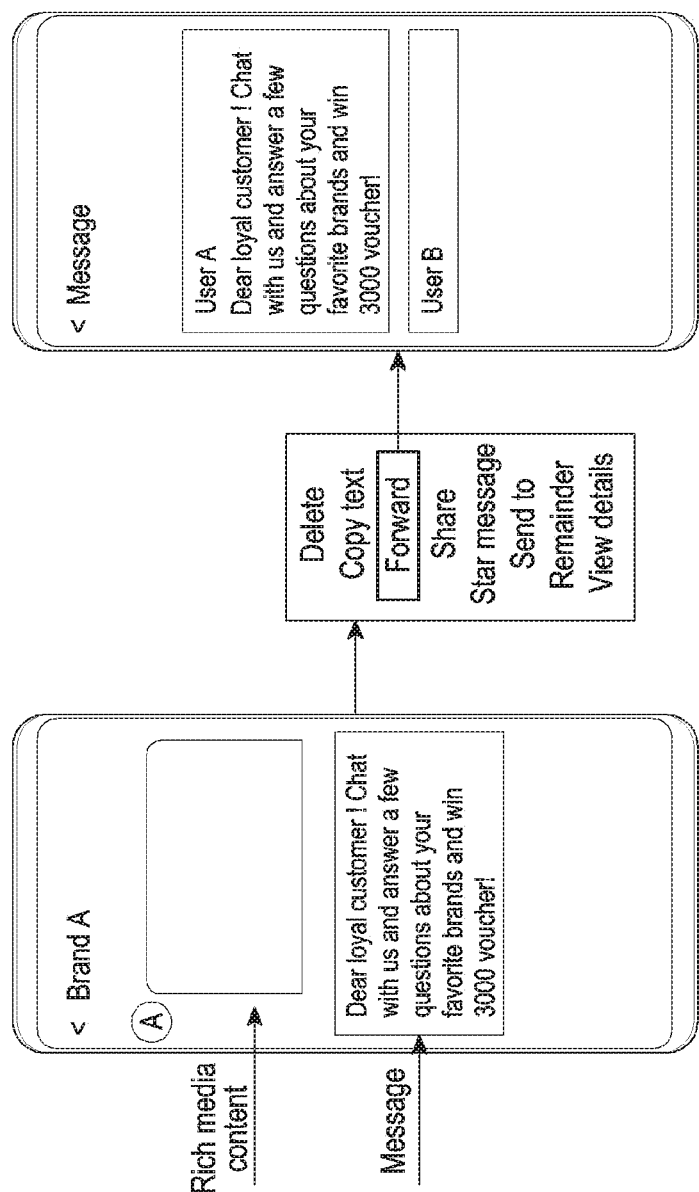

As illustrated in FIG. 7, the electronic device 108 receives a promotional message related to a brand A with a rich media content from the communication server 104/aggregator 106. In such a scenario, the electronic device 108 displays the promotional message of the brand A and the associated rich media content to the user. Also, the electronic device 108 provides one or more options to perform one or more actions on the rich media content. Examples of the options may be a delete option, a copy text option, a forward/share option, a star message option, a remainder option, and a view details option. Examples of the actions may be deleting the message based on the rich media content, saving the rich media content, and forwarding the rich media content to other users. For example, consider herein that, the user of the electronic device 108 selects the forward option to send the message including the rich media content to another user. In such a scenario, the electronic device 108 sends the message including the rich media content to the specified another user. The message including the rich media content may be displayed to the specified another user as the normal message.

Figure 8A:
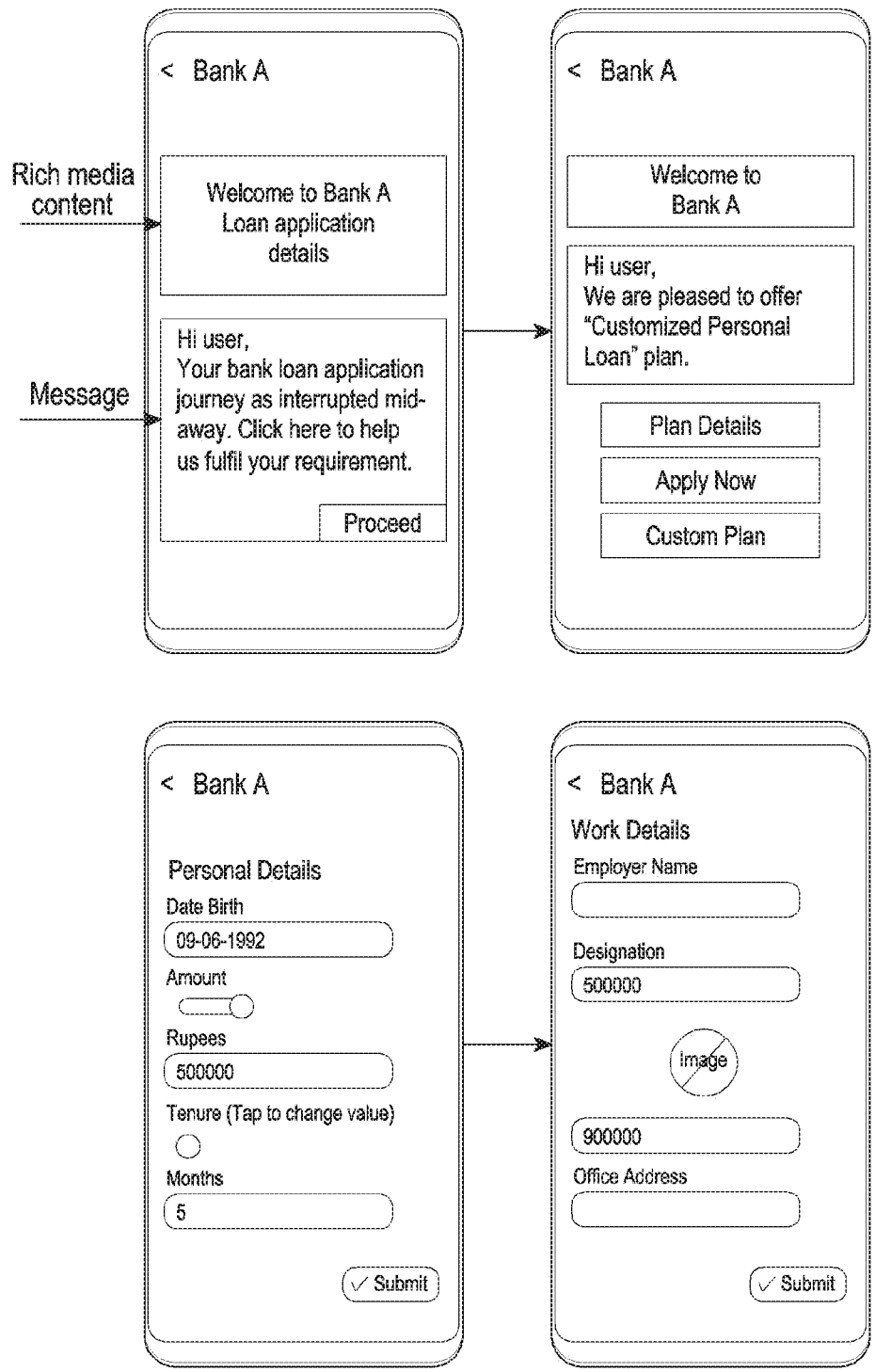

As illustrated in FIG. 8A, the user of the electronic device 108 has queried a bank A related to a loan application. In such a scenario, the electronic device 108 receives and displays a message with a rich media content related to the loan application corresponding to the bank A from the communication server 104/aggregator 106 to the user. For example, the rich media content may include an image depicting information related to the loan application. When the user clicks on the rich media content, the electronic device 108 displays the rich media content in a full screen. For example, the rich media content may include options such as plan details, an apply option, and custom plans. Further, consider that the user clicks on the apply option as an example. In such a scenario, the electronic device 108 receives and displays a person details page to the user to provide personal information.

Figure 8B:
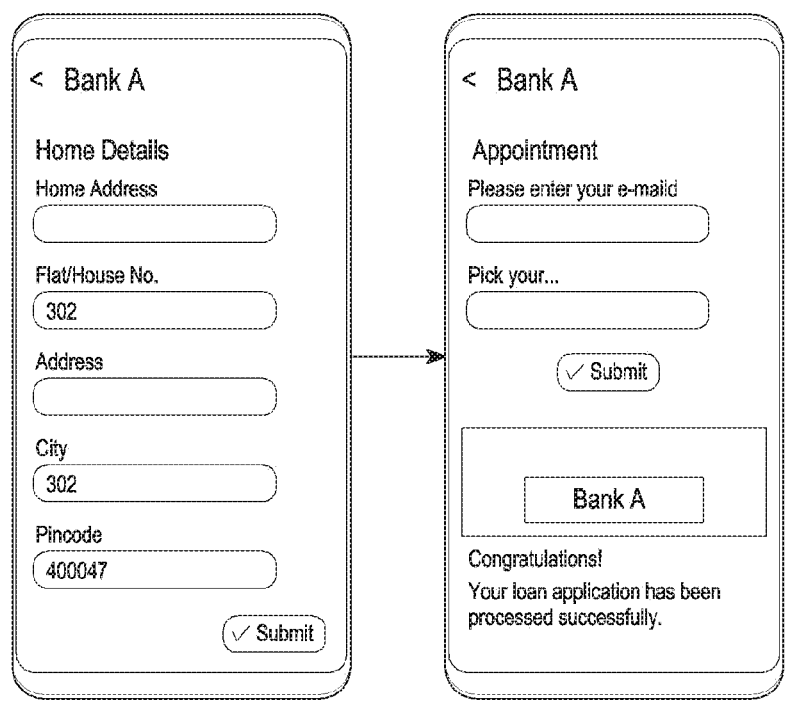

Upon providing and submitting the person details page by the user to the bank A, the electronic device 108 receives and displays a work details page from the bank A to the user to provide information related to the work. Upon providing and submitting the work details page by the user to the bank A, the electronic device 108 receives and displays a home details page to the user to provide information related to a home address, as illustrated in FIG. 8B. Upon providing all the necessary information to the bank A, the electronic device 108 receives and displays an appointment and confirmation page to the user, as illustrated in FIG. 8B. Thus, the user may apply for the loan using the rich media content, instead of visiting a website of the bank A.

Figure 9:
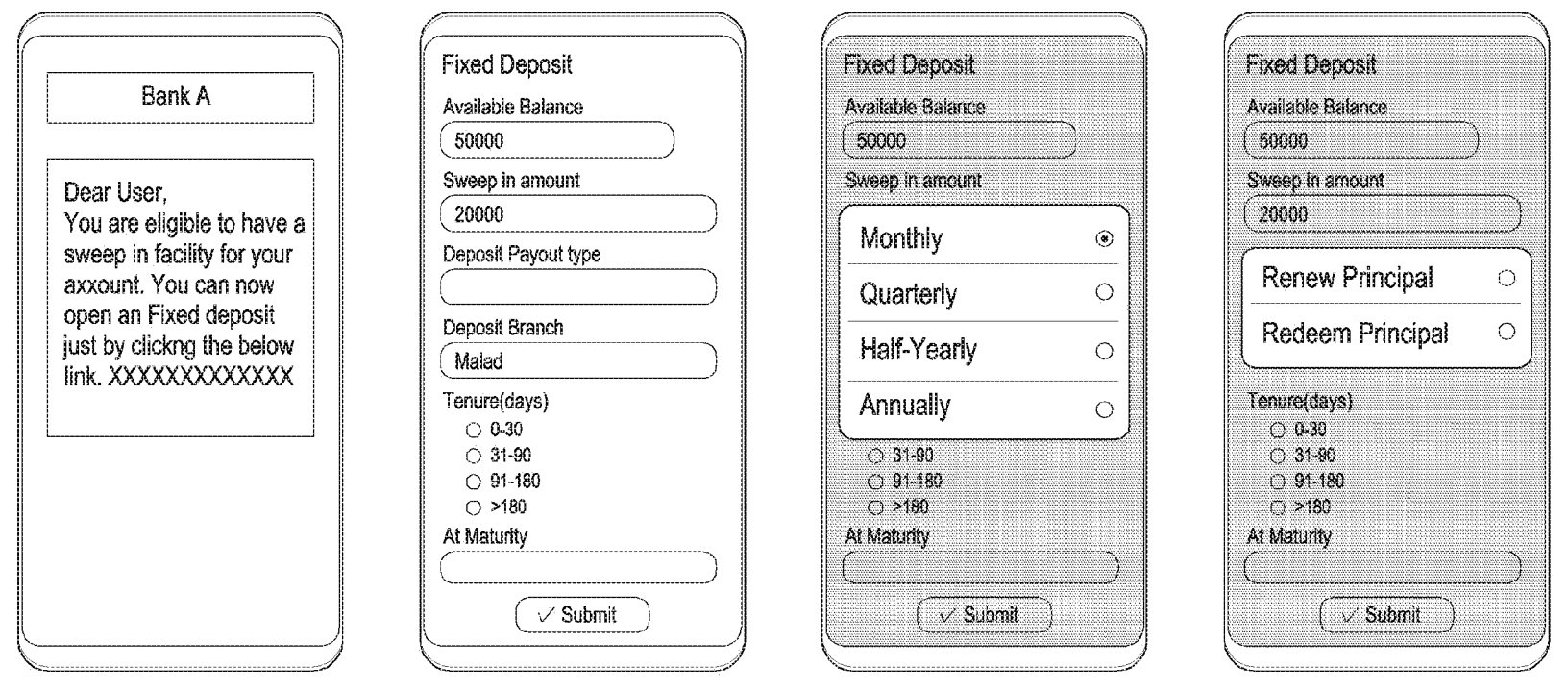

As illustrated in FIG. 9, the electronic device 108 receives and displays a message with a rich media content related to the bank A from the communication server 104/aggregator 106 to the user. The message may be a promotional message to the user for opening a fixed deposit account and the rich media content may include a link for opening the fixed deposit account. When the user clicks on the link included in the rich media content, the electronic device 108 receives and displays forms from the bank A to the user for opening the fixed deposit account. Thus, the user may open the fixed deposit account using the link in the rich media content, instead of visiting a website of the bank A.

Figure 10:
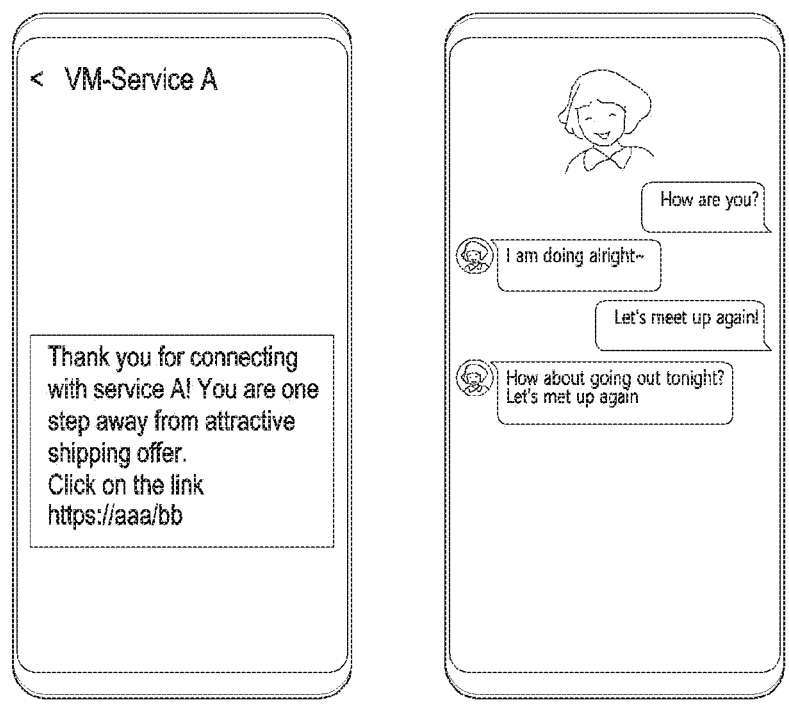

As illustrated in FIG. 10, the user of the electronic device 108 has queried a service A for shipping services. In such a scenario, the electronic device 108 may receive and display a message related to the shipping service and associated rich media content related to the service A from the communication server 104/aggregator 106 to the user. For example, the rich media content may include a chatbot link. When the user clicks on the chatbot link of the received message, the electronic device 108 establishes a communication with the chatbot engine of the service A and enables the user to chat with the chatbot engine for obtaining information related to the shipping services.

Figure 11:
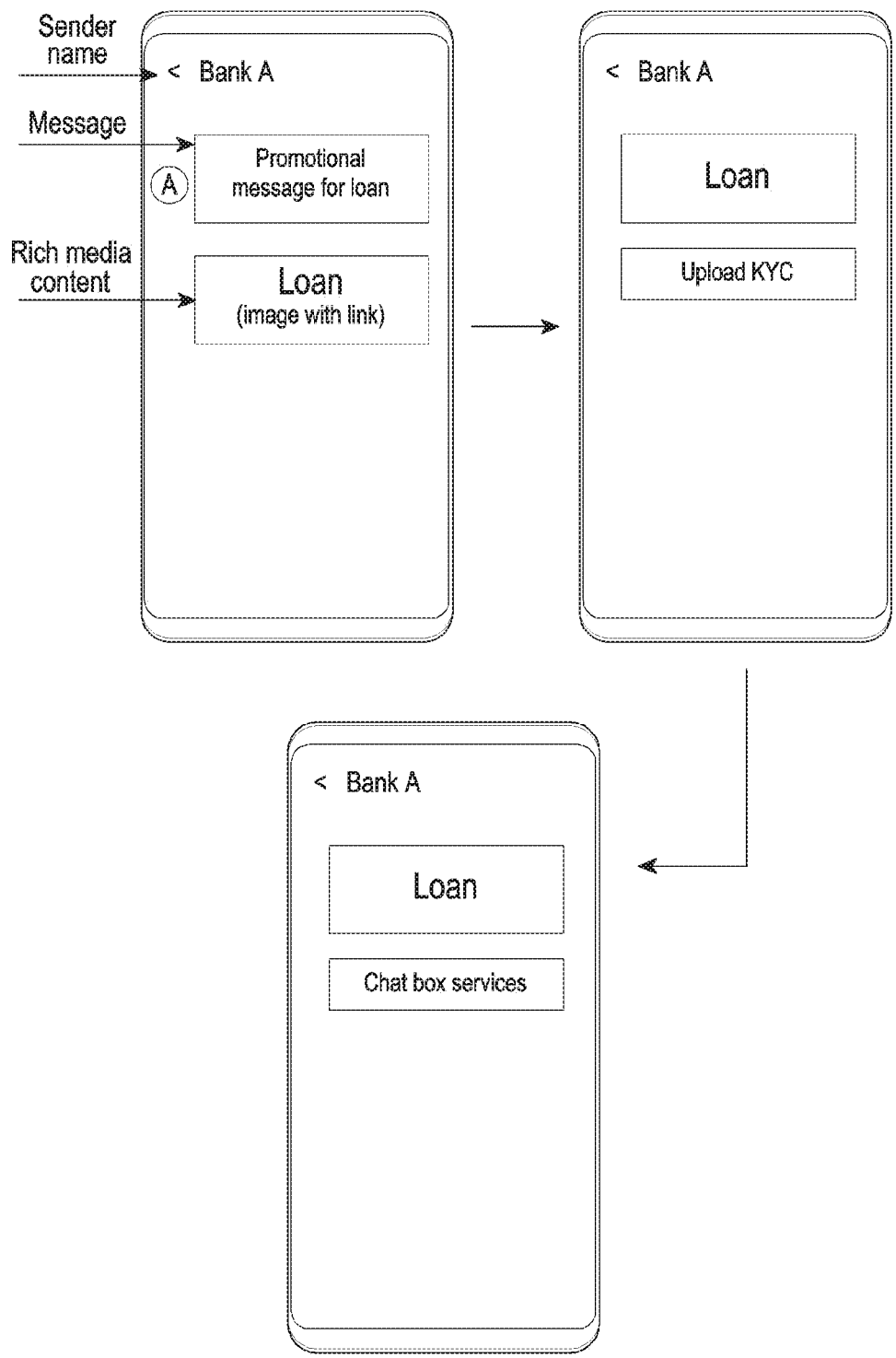

As illustrated in FIG. 11, the electronic device 108 receives and displays a message with a rich media content related to a bank A from the communication server 104/aggregator 106 to the user. For example, the message is a promotional message related to a loan offer and the rich media content may include a header with an image and a link related to the loan offer. When the user clicks on the link, the electronic device 108 launches chatbot services, wherein the user may enter details (for example, Know Your Customer (KYC) details) and submit the details to the bank. Based on the user entered details, the bank may interact with the user of the electronic device 108 in the chatbot services. Thus, the bank may introduce initial offers to the user instead of requesting the user to visit a website or an application of the bank.

Figure 12:
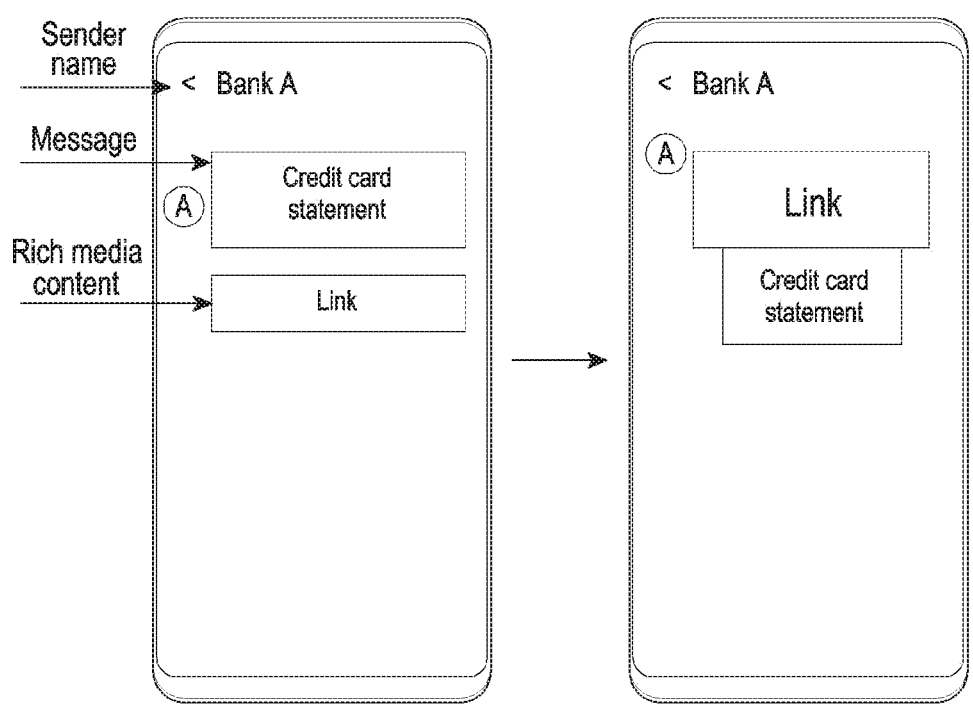

As illustrated in FIG. 12, the electronic device 108 receives and displays a message and associated rich media content of a bank A from the communication server 104/aggregator 106 to the user. For example, the message may provide information related to a credit card and the rich media content may include a link to obtain a credit card statement. The electronic device 108 enables the user to click on the link to view the credit card statement and use the link to make a payment related to the credit card from a bank account.

Figure 13:
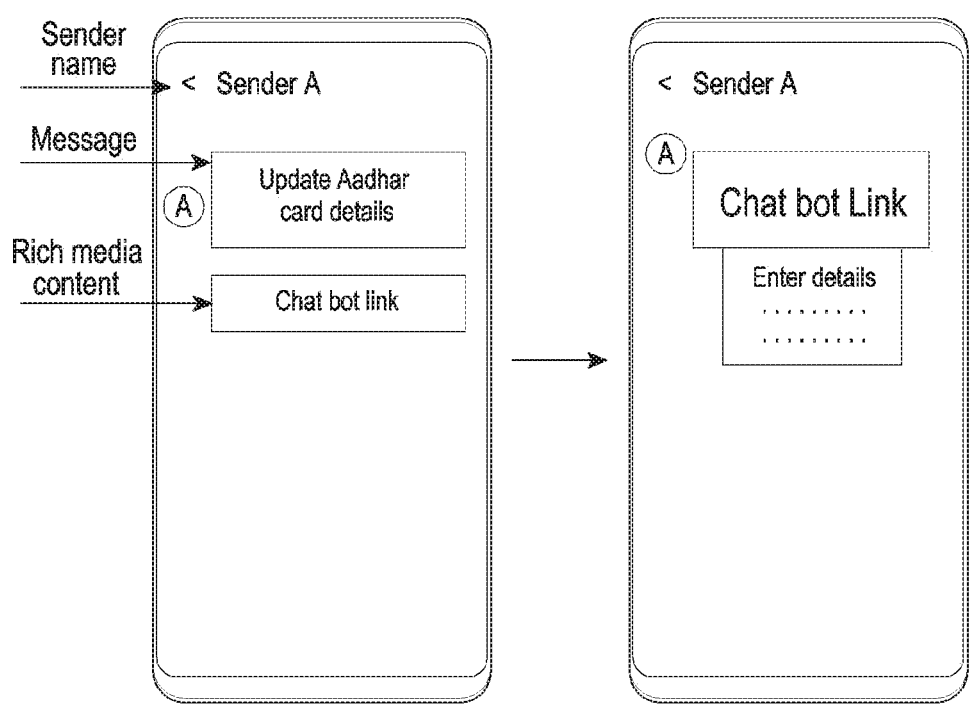

As illustrated in FIG. 13, the electronic device 108 receives and displays a message and associated rich media content of a Government agency from the communication server 104/aggregator 106 to the user. The message may be a notification for the user to update Aadhar details and the rich media content may include a chatbot link. The electronic device 108 launches the chatbot services using the chatbot link included in the rich media content, when the user clicks on the chatbot link. The electronic device 108 enables the user to enter the Aadhar details in the launched chatbot services.

Figure 14:
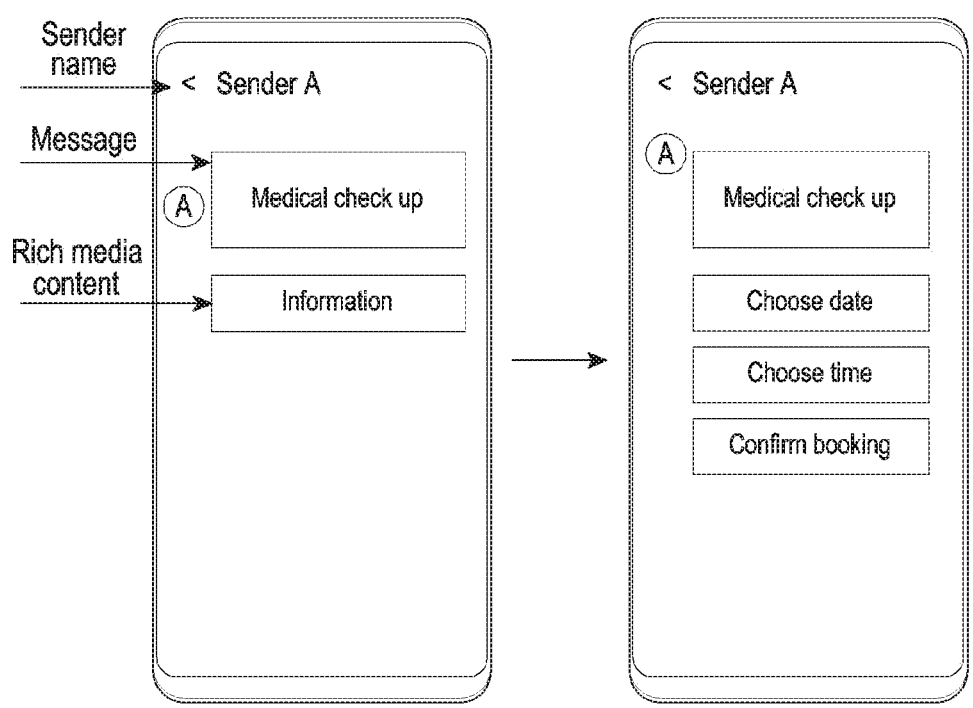

As illustrated in FIG. 14, the electronic device 108 receives and displays a message related to a medical centre from the communication server 104/aggregator 106 to the user, wherein the message includes the rich media content. The message may provide information related to medical check-up and the rich media content may include an image. When the user clicks on the image, the electronic device 108 opens the rich media content in a full screen. For example, the rich media content may provide details related to available time slots for the medical check-up and enable the user to choose one of the available time slots and book an appointment for the medical check-up.

Figure 15:
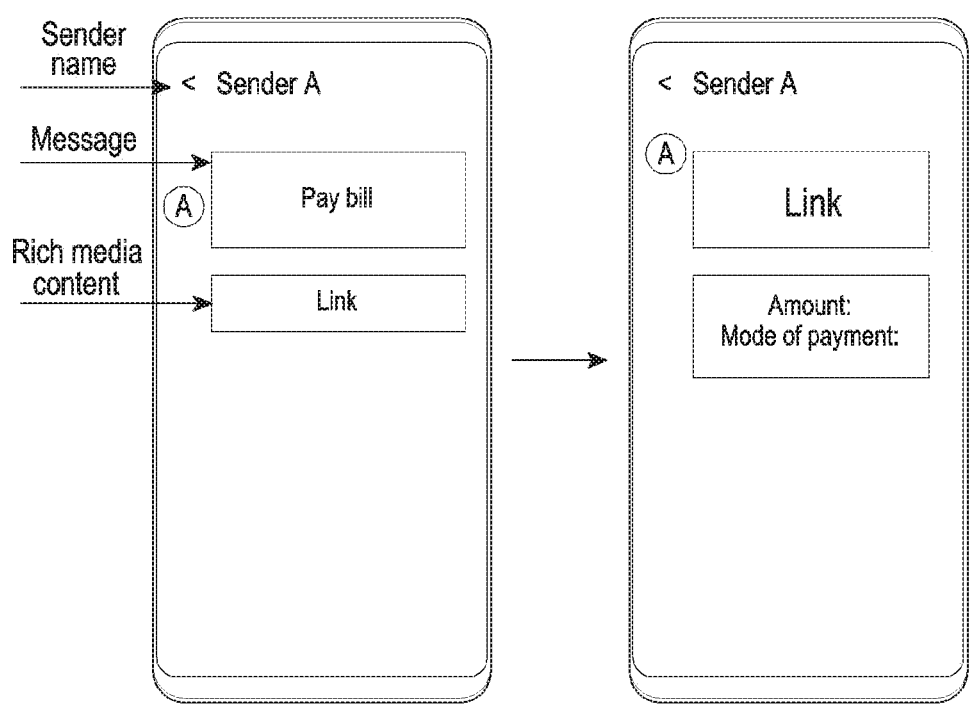

As illustrated in FIG. 15, the electronic device 108 receives and displays a message related to a service provider from the communication server 104/aggregator 106 to the user, wherein the message includes the rich media content. The message may include a notification for the user to pay a bill amount. The rich media content may include provide details such as contact number of the service provider, bill amount, and a link to pay the bill amount. In such a scenario, the user may use the rich media contact to check the details for paying the bill amount. The user may further click the link included in the rich media content to initiate a payment transaction for paying the bill amount.

Figure 16:
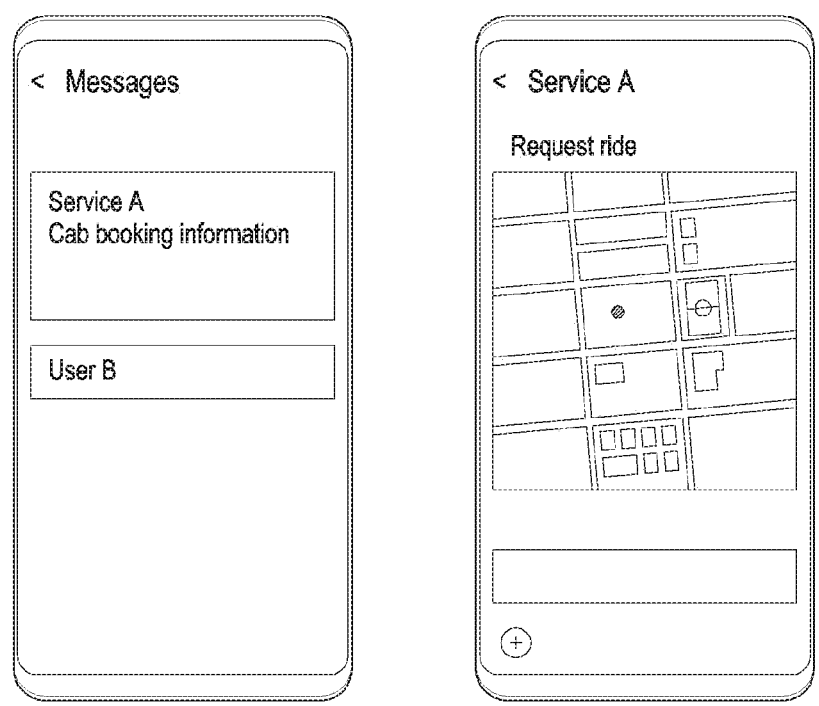

As illustrated in FIG. 16, the user of the electronic device 108 books a cab. In such a scenario, the electronic device 108 receives and displays a message including rich media content related to a cab service provider from the communication server 104/aggregator 106 to the user. The message may include a notification indicating a successful booking. The rich media content may provide details such as an arrival time, a travel time, a payment mode, and a navigation map. Thus, the user may check the cab details using the rich media content, instead of visiting a website/app of the cab service provider.

Figure 17:
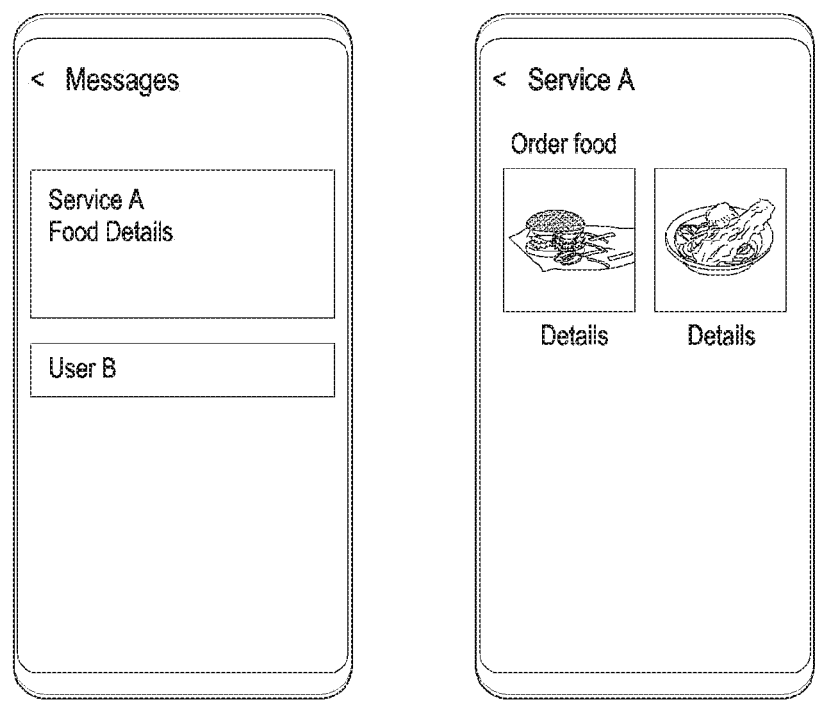

As illustrated in FIG. 17, the user of the electronic device 108 orders a food using an application of a food service provider. In such a scenario, the electronic device 108 receives and displays a message including a rich media content related to the food service provider from the communication server 104/aggregator 106 to the user. The message may include a notification of successful order. The rich media content may provide details such as ordered food details, images of the ordered food, and an expected delivery time. Thus, the user may check the order details using the rich media content, instead of visiting a website/app of the food service provider.

Figure 18:
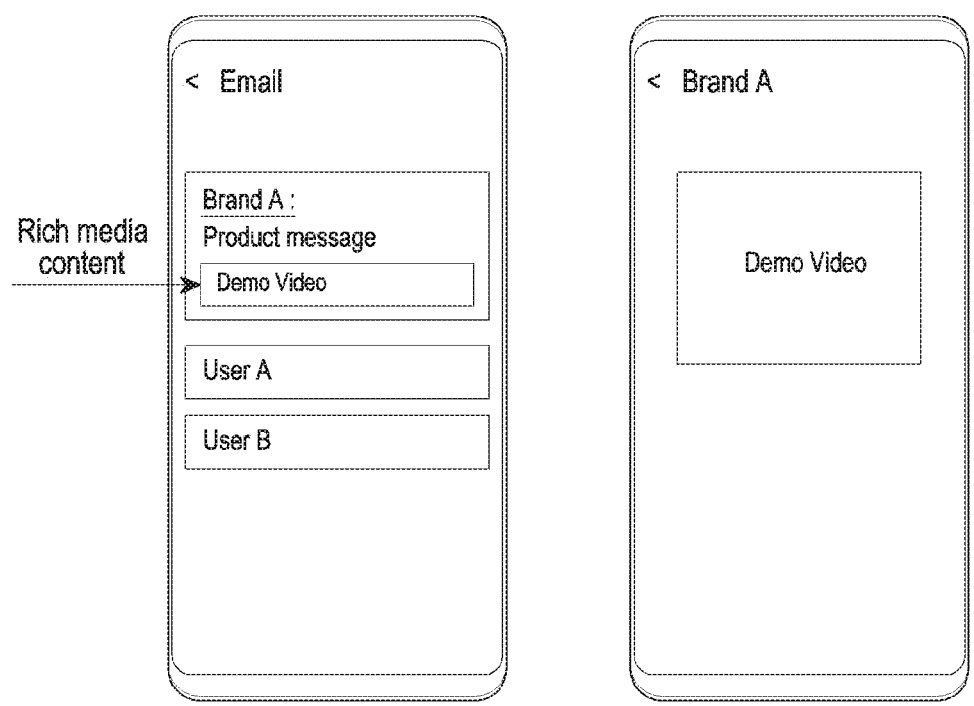

As illustrated in FIG. 18, the user of the electronic device 108 purchases a product of a particular brand. In such a scenario, the electronic device 108 receives and displays an email including a rich media content from the brand to the user. The message may include information related to the purchased product. The rich media content may include a demo video. Therefore, the user may use the demo video included in the rich media content to operate/use the product.

Figure 19A:
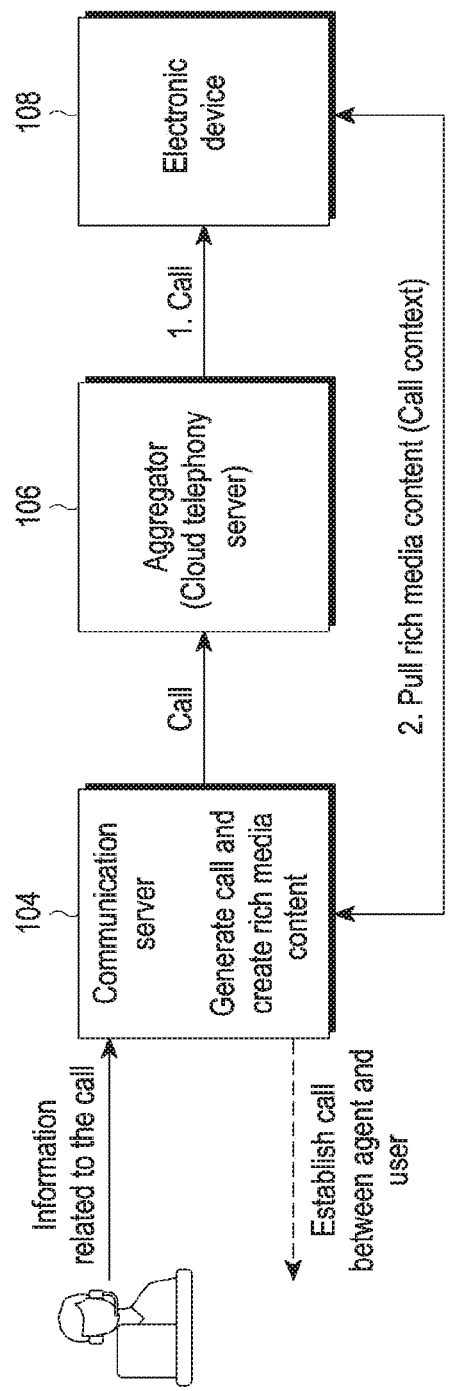
FIGS. 19A and 19B illustrate providing of a rich interactive call service/rich interactive call on the electronic device, according to an embodiment.
Figure 19B:
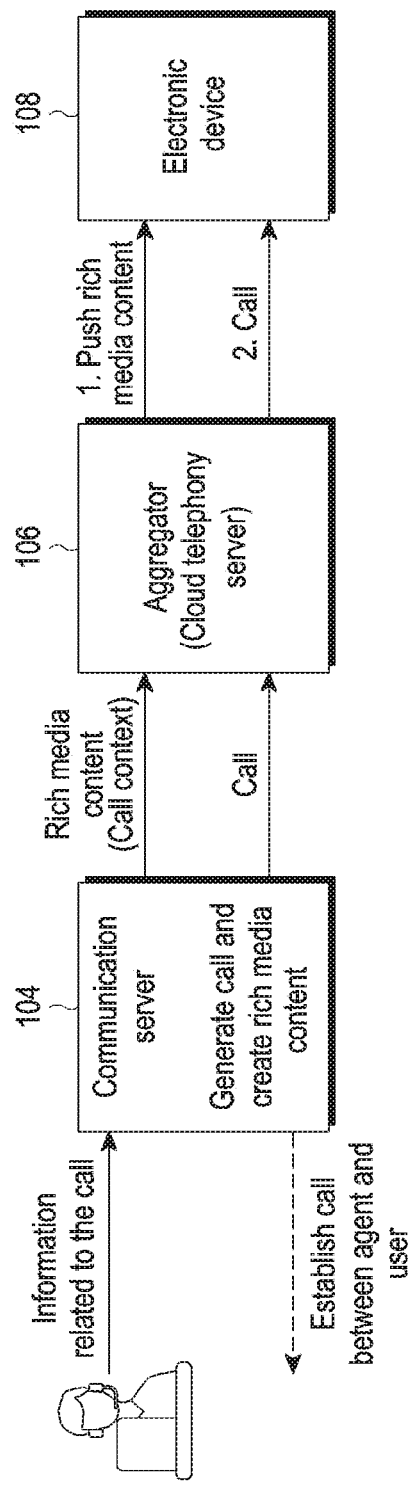

FIGS. 19A and 19B illustrate providing of a rich interactive call service/rich interactive call on the electronic device 108, according to an embodiment.

The entity server 102 enables the agent to provide the information related to a voice call, when the agent wants to initiate the voice call for the user of the electronic device 108. The entity server 102 forwards the information related to the voice call to the communication server 104 to generate the voice call for the user and create the rich media content for the generated voice call. The rich media content may include the call context. The communication server 104 may further generate the unique code for the generated voice call and map the rich media content with the unique code of the voice call. The communication server 104 provides the rich media content and the voice call to the aggregator/cloud telephony server 106.

As illustrated in FIG. 19A, the aggregator 106 provides the voice call to the electronic device 108 without providing any rich media content. In such a scenario, upon receiving the voice call, the electronic device 108 derives the unique code from the numbers associated with the received voice call. The electronic device 108 identifies the communication server 104 having the rich media content/call context for the received voice call from the derived unique code. The electronic device 108 accesses the identified communication server 104 and pulls the stored rich media content for the unique code of the received voice call. The electronic device 108 provides the notification of the voice call and the fetched rich media content to the user. Thus, the user may check the call context/purpose of the voice call to accept the voice call and may communicate with the agent.

As illustrated in FIG. 19B, the communication server 104 may push the rich media content and the mapped unique code to the electronic device 108 for storage, prior to providing the generated voice call. In such a scenario, upon receiving the voice call from the communication server 104, the electronic device 108 derives the unique code from the received voice call and fetches the stored rich media content for the derived unique code. The electronic device 108 provides the notification of the voice call and the fetched rich media content to the user.

Figure 20:
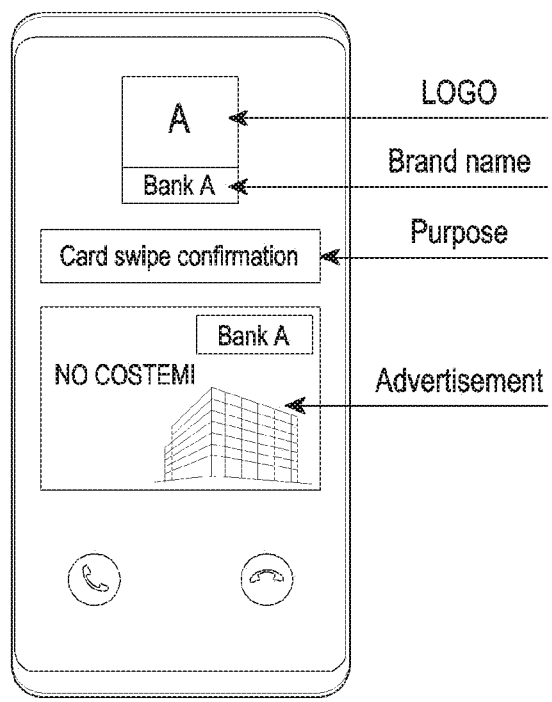
FIGS. 20 and 21 illustrate example scenarios of displaying the rich interactive voice call service on the electronic device, according to an embodiment.
Figure 21:
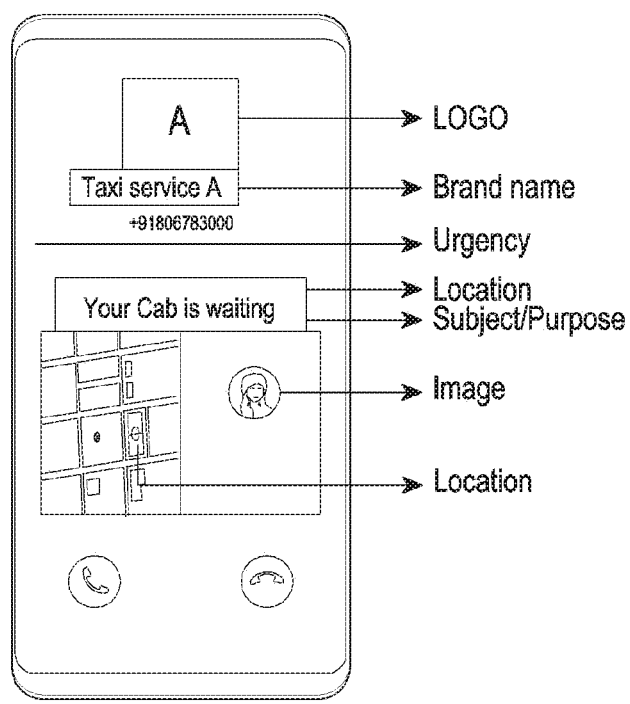

FIGS. 20 and 21 illustrate example scenarios of displaying the voice call service on the electronic device 108, according to an embodiment.

As illustrated in FIG. 20, the electronic device 108 receives a notification of the voice call through the communication server 104/aggregator 106, which has been initiated by an agent of a banking domain, In such a scenario, the electronic device 108 communicates with the communication server 104 and receives the rich media content for the received voice call. The electronic device 108 fetches the rich media content for the received voice call if the rich media content has been stored for the received voice call. The electronic device 108 displays the notification of the voice call and the rich media content to the user. For example, the rich media content may be the call context that provides details such as a bank name, a bank logo, a priority of the voice call, a purpose indicating that the voice call is for card swipe confirmation, and an advertisement related to the bank. Thus, the user may accept/reject the voice call based on the rich media context associated with voice call.

As illustrated in FIG. 21, the electronic device 108 receives a notification of the voice call through the communication server 104/aggregator 106, when the user books a cab. In such a scenario, the electronic device 108 communicates with the communication server 104 and receives the rich media content for the received voice call. The electronic device 108 fetches the rich media content for the received voice call if the rich media content has been stored for the received voice call. The electronic device 108 displays the notification of the voice call and the rich media content to the user. For example, the rich media content may be the call context that provides details such as a cab service provider name, a cab service provider logo, a priority of the voice call, a purpose indicating that an arrival of cab, an image of a driver of the cab, and a location of the cab. Thus, the user may accept/reject the voice call based on the rich media context associated with voice call.

Figure 22:
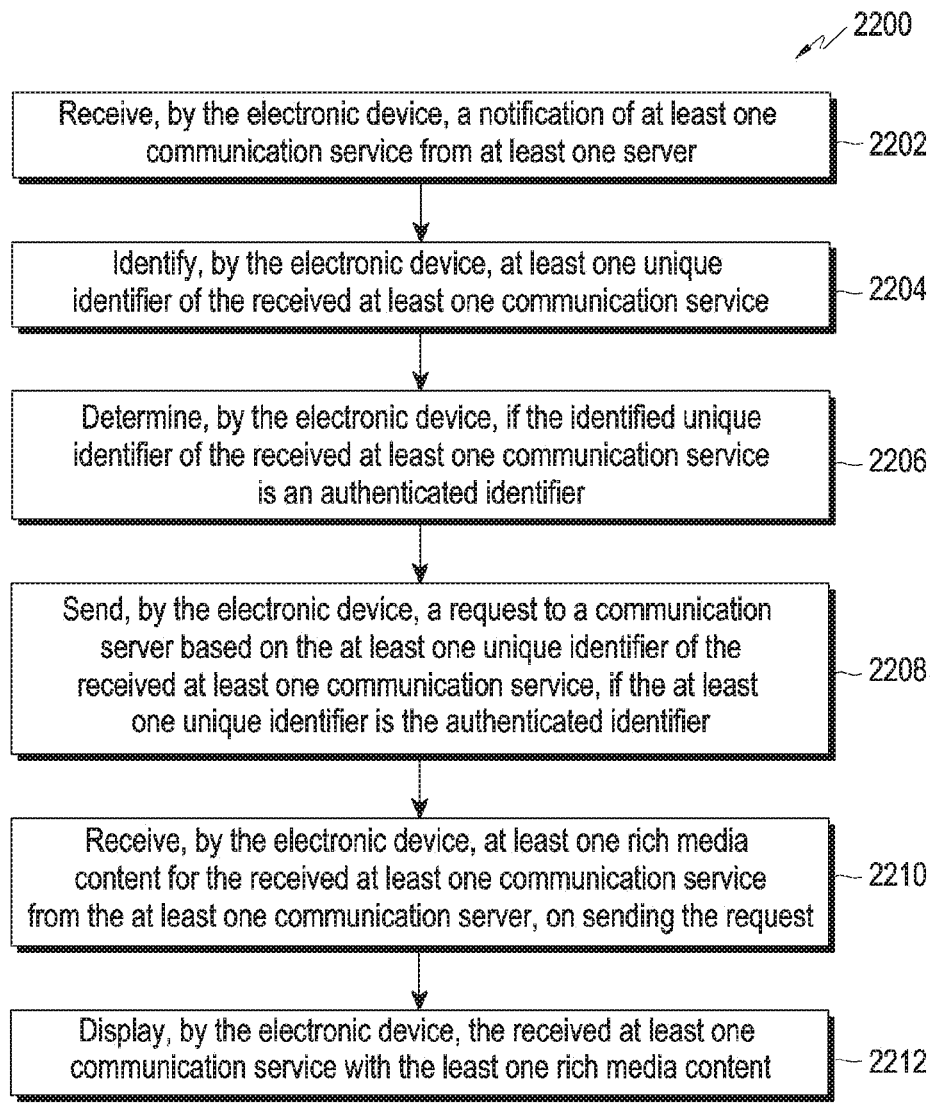
FIG. 22 illustrates a method for providing the rich interactive communication services on the electronic device, according to an embodiment.

FIG. 22 illustrates a method for providing the rich interactive communication services on the electronic device 108, according to an embodiment.

In step 2202, the method includes receiving, by the electronic device 108, the notification of the at least one communication service from the communication server 104 or the aggregator 106. In step 2204, the method includes identifying, by the electronic device 108, the at least one unique identifier of the received at least one communication service. The electronic device 108 may identify the at least one unique identifier by decoding/parsing the received communication service. The electronic device 108 may derive the at least one unique identifier by using content (contact numbers) associated with the received at least one communication service.

In step 2206, the method includes determining, by the electronic device 108, if the identified unique identifier of the received at least one communication service is the authenticated/whitelisted identifier.

In step 2208, the method includes sending, by the electronic device 108, the request to the communication server 104 based on the at least one unique identifier of the received at least one communication service, if the at least one unique identifier is the authenticated identifier. In step 2210, the method includes receiving, by the electronic device 108, the at least one rich media content for the received at least one communication service from the at least one communication server 104, upon sending the request. In step 2212, the method includes displaying, by the electronic device 108, the received at least one communication service with the least one rich media content. The various actions, acts, blocks, steps, or the like in the method and the flow diagram 2200 may be performed in the order presented, in a different order or simultaneously. Some of the actions, acts, blocks, steps, or the like may be omitted, added, modified, skipped, or the like without departing from the scope of the disclosure.

Embodiments herein enable a direct delivery of rich interactive communication services to at least one electronic device via a token system/unique identifier. The rich interactive communication service may include a communication service (for example, a message, a voice call, or the like) and an associated rich media content. The token/unique identifier may provide the electronic device with a pre-defined address to evoke at least one service (for example, chatbot services, paying bills, submitting forms, or the like).

Embodiments herein provide the rich interactive communication services to at least one user of the at least one electronic device that enable the user to:

perform chatbot engagements by providing out of box experience (OOBE) processes, which involves the user giving consent to the receive such communication services;

receive interactive graphical experiences, wherein the experiences may be promotional, support or transactional in nature;

receive short content related to a product or service; and perform actions using the rich media content of the received communication service, wherein the actions may be bill payment or submitting forms.

The embodiments disclosed herein can be implemented through at least one software program running on at least one hardware device and performing network management functions to control the elements. The elements shown in FIGS. 1, 2, and 3, can be at least one of a hardware device, or a combination of a hardware device and software module.

The embodiments disclosed herein describe methods and systems for providing rich interactive communication services on an electronic device. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g. Very high speed integrated circuit Hardware Description Language (VHDL) another programming language, or implemented by one or more VHDL or several software modules being executed on at least one hardware device. The hardware device can be any type of portable device that can be programmed. The device may also include means which could be e.g. hardware means like e.g. an ASIC, or a combination of hardware and software means, e.g. an ASIC and an FPGA, or at least one microprocessor and at least one memory with software modules located therein. The method embodiments described herein could be implemented partly in hardware and partly in software. The disclosure may be implemented on different hardware devices, e.g. using a plurality of CPUs.

While the disclosure has been shown and described with reference to various embodiments thereof, it will be understood by those skilled in the art that various changes in form and details may be made therein without departing from the spirit and scope of the disclosure as defined by the appended claims and their equivalents

What is claimed is:

1. A method for providing at least one rich interactive communication service on an electronic device, the method comprising:
    receiving, by the electronic device, at least one communication service and a notification of the at least one communication service from at least one server and providing the at least one communication service;
    identifying, by the electronic device, at least one unique identifier from the notification, the at least one unique identifier indicating that the corresponding at least one communication service is associated with at least one rich media including an actionable service for a user experience while providing the at least one communication service;
    determining, by the electronic device, that the identified unique identifier matches one of a plurality of unique identifiers maintained in the electronic device;
    in response to determining that the identified unique identifier matches the one of the plurality of unique identifiers, identifying, based on the identified unique identifier, an address of at least one communication server which has the at least one rich media, and sending, by the electronic device to the at least one communication server, a request for the at least one rich media of the at least one communication service based on the address, the request including the identified unique identifier;
    receiving, by the electronic device, the at least one rich media of the at least one communication service from the at least one communication server, responding to the request; and
    displaying, by the electronic device, the least one rich media while providing the at least one communication service.

2. The method of claim 1,
    wherein the at least one server includes at least one of the communication server and at least one aggregator.

3. The method of claim 1,
wherein the at least one communication service includes at least one of a messaging service, a voice call service, a data service, an augmented reality service, a virtual reality service, an emergency service, an internet protocol (IP) multimedia subsystem (IMS) service, and a rich communication service (RCS).

4. The method of claim 1,
wherein the at least one rich media includes at least one of media, a text, a link, an icon, and a link for chatbot services.

5. The method of claim 3, wherein identifying, by the electronic device, the at least one unique identifier of the received at least one communication service comprises:
deriving the at least one unique identifier using content associated with the received at least one communication service,
wherein the content includes contact numbers and the at least one communication service includes the voice call service.

6. The method of claim 1,
wherein the at least one unique identifier includes one of a domain name, a uniform resource locator (URL) of the domain name, a sender identifier (ID), a token, and a hash key.

7. The method of claim 4, further comprising:
performing, by the electronic device, at least one action, upon detecting a user behavior on the displayed at least one communication service with the at least one rich media,
wherein the at least one action includes one of displaying a preview of the at least one rich media, displaying interactive content related to the link in the at least one rich media, launching at least one service related to the link in the at least one rich media, and launching the chatbot services.

8. The method of claim 4, wherein receiving at least one rich media for the received at least one communication service from the at least one communication server comprises:
receiving, by the electronic device, the at least one communication service including the at least one unique identifier from the at least one server; and
fetching, by the electronic device, the at least one rich media for the at least one unique identifier of the received at least one communication service.

9. An electronic device for at least one rich interactive communication service, the electronic device comprising:
a memory; and
at least one processor configured to:
receive at least one communication service and a notification of the at least one communication service from at least one server and provide the at least one communication service,
identify at least one unique identifier from the notification, the at least one unique identifier indicating that the corresponding at least one communication service is associated with at least one rich media including an actionable service for a user experience while providing the at least one communication service,
determine that the identified at least one unique identifier of the received at least one communication service matches one of a plurality of unique identifiers maintained in the electronic device,
in response to determining that the identified unique identifier matches the one of the plurality of unique identifiers, identify, based on the identified unique identifier, an address of at least one communication server which has the at least one rich media, and send a request for the at least one rich media of the at least one communication service to the at least one communication server based on the address, the request including the identified unique identifier,
receive the at least one rich media of the at least one communication service from the at least one communication server, responding to sending the request, and
display the received at least one communication service with the least one rich media while providing the at least one communication service.

10. The electronic device of claim 9,
wherein the at least one communication service includes at least one of a messaging service, a voice call service, a data service, an augmented reality service, a virtual reality service, an emergency service, an internet protocol (IP) multimedia subsystem (IMS) service, and a rich communication service (RCS),
wherein the at least one rich media includes at least one of media, a text, a link, an icon, and a link for chatbot services,
wherein the at least one unique identifier includes one of a domain name, a uniform resource locator (URL) of the domain name, a sender identifier (ID), a token, and a hash key.

11. The electronic device of claim 10, wherein the processor is further configured to:
perform at least one action, upon detecting a user behavior on the displayed at least one communication service with the at least one rich media, wherein the at least one action includes one of, displaying a preview of the at least one rich media, displaying interactive content related to the link in the at least one rich media, launching at least oner service related to the link in the at least one rich media, and launching the chatbot services;
receive the at least one communication service including the at least one unique identifier from the at least one server; and
fetch the received at least one rich media for the at least one unique identifier of the received at least one communication service.

\* \* \* \* \*

UNITED STATES PATENT AND TRADEMARK OFFICE
CERTIFICATE OF CORRECTION

| | |
|---|---|
| PATENT NO. | : 11,601,551 B2 |
| APPLICATION NO. | : 17/020055 |
| DATED | : March 7, 2023 |
| INVENTOR(S) | : Sreenivasa Dhamaragunta Reddy et al. |

It is certified that error appears in the above-identified patent and that said Letters Patent is hereby corrected as shown below:

In the Claims

In Column 24, Line 62 in Claim 1:
"displaying, by the electronic device, the least one rich"
Should be:
-- displaying, by the electronic device, the at least one rich --.

Signed and Sealed this
Thirty-first Day of October, 2023

Katherine Kelly Vidal
*Director of the United States Patent and Trademark Office*